(12) United States Patent
Yu et al.

(10) Patent No.: US 11,929,775 B2
(45) Date of Patent: Mar. 12, 2024

(54) MOBILE TERMINAL

(71) Applicant: Huawei Technologies Co., Ltd., Shenzhen (CN)

(72) Inventors: Zhuojun Yu, Shanghai (CN); Jinhua Liu, Shenzhen (CN); Yingming Li, Shanghai (CN); Yuqing Zhang, Shenzhen (CN); Chien Feng Yeh, Shenzhen (CN); Renxuan Qin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 17/294,252

(22) PCT Filed: Nov. 16, 2018

(86) PCT No.: PCT/CN2018/116040
§ 371 (c)(1),
(2) Date: May 14, 2021

(87) PCT Pub. No.: WO2020/097940
PCT Pub. Date: May 22, 2020

(65) Prior Publication Data
US 2022/0006478 A1     Jan. 6, 2022

(51) Int. Cl.
*H04B 1/03*     (2006.01)
*H04B 1/08*     (2006.01)
(Continued)

(52) U.S. Cl.
CPC ........ *H04B 1/3833* (2013.01); *H04M 1/0266* (2013.01); *H04R 7/045* (2013.01);
(Continued)

(58) Field of Classification Search
CPC .......... H04B 1/3833; H04B 1/03; H04B 1/08; H04M 1/0266; H04M 2201/08;
(Continued)

(56) References Cited

U.S. PATENT DOCUMENTS 9,189,015 B2 *   11/2015   Tseng ................... G06F 1/1681
10,049,536 B2 *   8/2018   Khoshkava ............ H02K 33/02
(Continued)

FOREIGN PATENT DOCUMENTS

CN      201629840 U     11/2010
CN      204929237 U     12/2015
(Continued)

*Primary Examiner* — Andrew Wendell
(74) *Attorney, Agent, or Firm* — Conley Rose, P.C.

(57) ABSTRACT

A mobile terminal, includes a housing, and a middle frame and a display that are disposed in the housing. The display is coupled to the middle frame. An accommodation space is formed between the display and the middle frame. In addition, the mobile terminal further includes a first magnet and a second magnet, and a part of the first magnet and a part of the second magnet are disposed in the accommodation space. The first magnet is disposed on a back facet of the display, the second magnet is disposed on the middle frame, and the first magnet and the second magnet are disposed face to face.

20 Claims, 13 Drawing Sheets

(51) Int. Cl.
*H04B 1/3827* (2015.01)
*H04M 1/02* (2006.01)
*H04R 7/04* (2006.01)
*H04R 9/02* (2006.01)

(52) U.S. Cl.
CPC ......... *H04R 9/025* (2013.01); *H04M 2201/08* (2013.01); *H04M 2201/38* (2013.01); *H04R 2499/11* (2013.01)

(58) Field of Classification Search
CPC ...... H04M 2201/38; H04M 1/03; H04M 1/02; H04R 7/045; H04R 9/025; H04R 2499/11; H04R 9/06; H04R 11/02; H04R 9/10; H04R 7/00; H04R 9/045; H04R 9/046; H04R 2499/15
See application file for complete search history.

(56) References Cited

U.S. PATENT DOCUMENTS

| | | | |
|---|---|---|---|
| 2002/0008602 A1 | 1/2002 | Kyouno et al. | |
| 2002/0065113 A1 | 5/2002 | Mori | |
| 2005/0180592 A1 | 8/2005 | Miura | |
| 2006/0012559 A1 | 1/2006 | Kang | |
| 2008/0058002 A1* | 3/2008 | Mori | H04M 1/0266 455/550.1 |
| 2011/0176969 A1 | 7/2011 | Michiaki et al. | |
| 2014/0066140 A1 | 3/2014 | Baek | |
| 2014/0119556 A1 | 5/2014 | Tanaka | |
| 2014/0241564 A1 | 8/2014 | Kang et al. | |
| 2015/0010190 A1 | 1/2015 | Lee et al. | |
| 2016/0165027 A1 | 6/2016 | Hahn et al. | |
| 2016/0205479 A1* | 7/2016 | Tomar | H04R 9/063 381/398 |
| 2017/0034322 A1* | 2/2017 | Pan | H04W 88/02 |
| 2017/0188139 A1 | 6/2017 | Despotuli | |
| 2017/0318392 A1 | 11/2017 | Kajanus | |
| 2018/0317011 A1* | 11/2018 | Choi | H04R 7/04 |
| 2018/0317012 A1 | 11/2018 | Lee et al. | |
| 2019/0004566 A1* | 1/2019 | Lee | H04R 9/045 |
| 2019/0052738 A1* | 2/2019 | Zeng | G06F 1/1652 |
| 2019/0230444 A1 | 7/2019 | Guo et al. | |
| 2019/0268681 A1 | 8/2019 | Masuda et al. | |
| 2021/0136499 A1* | 5/2021 | Ge | H04R 9/10 |

FOREIGN PATENT DOCUMENTS

| | | |
|---|---|---|
| CN | 105553217 A | 5/2016 |
| CN | 105872862 A | 8/2016 |
| CN | 107113508 A | 8/2017 |
| CN | 206602646 U | 10/2017 |
| CN | 107623885 A | 1/2018 |
| CN | 206835357 U | 1/2018 |
| CN | 207075080 U | 3/2018 |
| CN | 108124218 A | 6/2018 |
| CN | 108347678 A | 7/2018 |
| CN | 108429837 A | 8/2018 |
| CN | 108566602 A | 9/2018 |
| CN | 108616797 A | 10/2018 |
| CN | 108650599 A | 10/2018 |
| CN | 108810759 A | 11/2018 |
| CN | 208079143 U | 11/2018 |
| CN | 110572749 A | 12/2019 |
| EP | 1480489 A2 | 11/2004 |
| EP | 3330780 A1 | 6/2018 |
| JP | S5528040 A | 2/1980 |
| JP | 2002164977 A | 6/2002 |
| JP | 2005012360 A | 1/2005 |
| JP | 2006033832 A | 2/2006 |
| JP | 2006074597 A | 3/2006 |
| JP | 2007300578 A | 11/2007 |
| JP | 5528040 B2 | 6/2014 |
| JP | 2018093469 A | 6/2018 |
| KR | 20040066064 A | 7/2004 |
| KR | 101012299 B1 | 2/2011 |
| KR | 101250288 B1 | 4/2013 |
| KR | 20130091186 A | 8/2013 |
| KR | 20170135465 A | 12/2017 |
| KR | 20180121296 A | 11/2018 |
| WO | 9939843 A1 | 8/1999 |
| WO | 2006137665 A1 | 12/2006 |
| WO | 2018123292 A1 | 7/2018 |

* cited by examiner

MOBILE TERMINAL

CROSS-REFERENCE TO RELATED APPLICATIONS

This application is a U.S. National Stage of International Patent Application No. PCT/CN2018/116040 filed on Nov. 16, 2018, which is hereby incorporated by reference in its entirety.

TECHNICAL FIELD

This application relates to the field of display technologies, and in particular, to a mobile terminal.

BACKGROUND

Functions of a mobile terminal, for example, a mobile phone, tend to be increasingly diversified. A plurality of devices, for example, a camera, a receiver, and a photosensitive device used for fingerprint collection, used to implement different functions need to be integrated into the mobile phone. However, because an architecture space inside the mobile phone is limited, there is no enough space to deploy more functional devices, and consequently, an integration effect of functions of the mobile phone is reduced.

SUMMARY

Embodiments of this application provide a mobile terminal, to resolve a problem that an architecture space inside the mobile terminal is relatively small.

To achieve the foregoing objective, the following technical solutions are used in this application:

According to an aspect of the embodiments of this application, a mobile terminal is provided, including a housing, and a middle frame and a display module that are disposed in the housing. The display module may be mounted on a bearing table of the middle frame by using foam adhesive, so that the display module is connected to the middle frame. An accommodation space is formed between the display module and the middle frame. In addition, the mobile terminal further includes a first magnet and a second magnet, and at least a part of the first magnet and at least a part of the second magnet are disposed in the accommodation space. The first magnet is disposed on a back facet of the display module, the second magnet is disposed on the middle frame, and the first magnet and the second magnet are disposed face to face. In this case, the foam adhesive used to fasten die display module to the middle frame is elastic to some extent, and can be deformed under an action of an external force. In this way, when the first magnet receives the first drive signal used as a high-frequency signal, and when the first magnet may vibrate, under an effect of a magnetic field generated by the first magnet and a magnetic field generated by the second magnet in a direction perpendicular to a light-emitting surf ace of the display module, the first magnet may drive the display module to move up and down, relative to the middle frame, at a small amplitude and a high frequency. In this case, the small-amplitude and high-frequency vibration of the display module cannot drive the middle frame to vibrate. Therefore, the middle frame is approximately in a static state. In this case, driven by the first magnet, the display module is used as a diaphragm to push air to generate sounds in the vibration process, so as to implement sound on display, thereby implementing a function of a receiver or a speaker. In this case, a sound hole does not need to be disposed in the mobile terminal, so that a problem that sound quality is affected because the sound hole is blocked can be resolved. In addition, a hole opening process in the mobile terminal is reduced, so that a surface of a display side of the mobile terminal is more flat and rounded.

Optionally, the first magnet is a coil, and the second magnet is a main magnet. Alternatively, the first magnet is a main magnet, and the second magnet is a coil. When the first magnet is a coil, the coil, the display module, and the foam adhesive used to fasten the display module to the middle frame form a sound system used to implement the sound on display. In a process of implementing the sound on display, the coil drives the display module to be used as the diaphragm, to push the air to generate sounds in the vibration process. Alternatively; when the first magnet is a main magnet, the main magnet, the display module, and the foam adhesive used to fasten the display module to the middle frame form a sound system used to implement the sound on display, in a process of implementing the sound on display, the main magnet drives the display module to be used as the diaphragm, to push the air to generate sounds in the vibration process.

Optionally, a part of the main magnet is embedded in a closed region wound by a wire of the coil. In this case, in the process of implementing the sound on display, after the coil receives the first drive signal, when the first magnet is the coil, a magnetic field generated by the coil interacts with a magnetic field generated by the main magnet so that the coil drives the display module to vibrate up and down in a magnetic line cutting manner at a small amplitude and a high frequency. Alternatively, when the first magnet is the main magnet the main magnet is reacted by the coil, and die coil drives, the display module to vibrate at a high frequency.

Optionally, the mobile terminal further includes at least one auxiliary magnet. The auxiliary magnet and the main magnet are located on a same side, and there is a gap between the auxiliary magnet and the main magnet. In addition, a part of the coil is located in the gap between the auxiliary magnet and the main magnet. In this way, the magnetic field generated by the coil not only can interact with the magnetic Held generated by the main magnet, hut also can interact with a magnetic Held generated by the at least one auxiliary magnet, to achieve an objective of improving vibration intensity of the coil or vibration intensity of the main magnet.

Optionally, the main magnet is located outside a closed region wound by a wire of the coil. In addition, the main magnet is parallel to a surface opposite to the coil. In this case, in the process of implementing the sound on display; when the coil receives the first drive signal, the coil rind the main magnet can attract or repel each other in the magnetic field generated by the coil and the magnetic field generated by the main magnet, so that the first magnet (the coil or the main magnet) vibrates, relative to the second magnet (the main magnet or the coil), at a small amplitude and a high frequency. In this way, the first magnet drives the display module to vibrate at a small amplitude and a high frequency, to implement the sound on display.

Optionally, the mobile terminal further includes one auxiliary magnet. The auxiliary magnet and the coil are located on a same side, and the auxiliary magnet is embedded in the closed region wound by the wire of the coil. A technical effect of the auxiliary magnet is the same as that described above. Details are not described herein again.

Optionally, a hole is disposed in the middle frame. The mobile terminal includes a support. At least a part of the second magnet is located in the hole on the middle frame. The support is disposed on a surface of a side that is of die middle frame and that is away from the display module, and is connected to the middle frame. In addition, the second magnet passes through the hole on the middle frame, and is disposed on the support. The hole is formed on the middle frame, so that the second magnet can pass through the hole and be disposed on the surface of the side that is of the middle frame and that is away from the display module. In this way, a spacing between the first magnet and the second magnet can be increased, thereby helping increase a vibration space of the first magnet and the second magnet.

Optionally, the mobile terminal further includes a spring plate and a support block. Die spring plate and the support block are located in the hole on the middle frame. The spring plate is located between the second magnet and the support, and the spring plate is connected to the second magnet. In addition, the support block is disposed between the spring plate and the support, and an upper surface and a lower surface of the support block are respectively connected to the spring plate and the support. A resonance frequency of a sound system including the first magnet, the display module, and the foam adhesive is far greater than a resonance frequency of a vibration system including the spring plate. Therefore, the spring plate can work as a frequency divider. When the coil receives an intermediate-frequency or high-frequency first drive signal, the first magnet drives the display module to vibrate, so that the sound system works, thereby implementing the sound on display. When the coil receives a low-frequency second drive signal, the second magnet drives the spring plate and the middle frame connected to the spring plate to vibrate, so that the vibration system works, thereby implementing vibration of an entire mobile terminal.

Optionally, the mobile terminal further includes a spring plate and a support block. The spring plate, the support block, the first magnet, and the second magnet are all located in the accommodation space. In addition, the spring plate is located between the second magnet and the middle frame, and the spring plate is connected to the second magnet. The support block is disposed between the spring plate and the middle frame, and an upper surface and a lower surface of the support block are respectively connected to the spring plate and the middle frame. When a gap between the display module and the middle frame is large enough, components such as the first magnet, the second magnet, and the spring plate may all be disposed in the accommodation space formed between the display module and the middle frame. A technical effect of the spring plate is the same as that described above. Details are not described herein again.

Optionally, the mobile terminal further includes a support plate. An upper surface of the support plate is connected to the display module, and a lower surface of the support plate is connected to the first magnet. An area of the upper surface of the support plate is greater than an area of a surface of a side that is of the first magnet and that is close to the support plate. In this way, because the support plate is of a sheet structure, a contact area between the support plate and the display module is relatively large. Therefore, the upper surface and the lower surface of the support plate are respectively in contact with the display module and the first magnet, so that a contact area between the first magnet and the display module can be increased, and a driving force provided for the display module can be applied to the display module more evenly in a vibration process of the first magnet. In addition, by using the support plate, a deformed area of the display module may be further expanded, so that vibration efficiency of the display module driven by the first magnet is increased, power consumption is reduced, and a sound on display effect is improved.

Optionally, the mobile terminal further includes a washer. When the first magnet is the main magnet, the washer is located on a surface of a side that is of the main magnet and that is away from the display module. Alternatively, when the second magnet is the main magnet, the washer is located on a surface of a side that is of the main magnet and that is away from the middle frame. The washer is nude of low-carbon steel. The washer has a magnetic conduction function, to reduce magnetic resistance of the main magnet. In addition, the washer has a magnetic isolation function.

Optionally, the mobile terminal further includes a magnetic bowl for carrying the main magnet. When the second magnet is the main magnet, the magnetic bowl is located on a surface of a side that is of the main magnet and that is away from the display module. The magnetic bowl may be made of stainless steel. In this case, the magnetic bowl may have a magnetic isolation function, to reduce a probability that a magnetic field generated by the main magnet has an adverse impact on another device in the mobile terminal.

Optionally, the mobile terminal further includes a first magnetic shield and a second magnetic shield. The main magnet is located in the first magnetic shield, and for the main magnet, all surfaces except a surface of a side facing the coil are wrapped by the first magnetic shield. In addition, the coil is located in the second magnetic shield, and for the coil, all surfaces except at least a surface of a side facing the main magnet are wrapped by the second magnetic shield. The first magnetic shield may reduce a probability that a magnetic field generated by the main magnet has an adverse impact on another device in the mobile terminal, and the second magnetic shield may reduce a probability that a magnetic field generated by the coil has an adverse impact on another device in the mobile terminal.

Optionally, when the mobile terminal includes the auxiliary magnet, the auxiliary magnet is located in the second magnetic shield, and a surface that is of the coil and that is opposite to the auxiliary magnet is not covered by the second magnetic shield. The second magnetic shield may further reduce a probability that a magnetic field generated by the auxiliary magnet has an adverse impact on another device in the mobile terminal.

BRIEF DESCRIPTION OF DRAWINGS

FIG. 8b is a top view of a coil and a main magnet shown in FIG. 8a;

FIG. 8c is another top view of a coil and a main magnet shown in FIG. 8a;

FIG. 9b is another schematic structural diagram of a first magnet and a second magnet in the mobile terminal shown in FIG. 4a;

FIG. 10a is a schematic diagram of interaction between a magnetic field generated by a coil and a magnetic field generated by a main magnet shown in FIG. 9a;

FIG. 10b is another schematic diagram of interaction between a magnetic field generated by a coil and a magnetic field generated by a main magnet shown in FIG. 9a;

FIG. 11 is another schematic structural diagram of a first magnet and a second magnet in the mobile terminal shown in FIG. 4a;

FIG. 12b is a schematic structural diagram of the elastic element in FIG. 12a;

FIG. 10 is a schematic diagram of a disposing, manner of an oscillator and a spring plate in the mobile terminal shown in FIG. 12a;

REFERENCE NUMERALS

01—mobile terminal: 10—display module: 101—display panel: 102—back light unit: 103—cover; 11—middle frame; 110—bearing table; 111—foam adhesive; 12—housing; 20—accommodation space: 21—first magnet: 22—second magnet: 201—oscillator; 211—coil; 212—support plate: 202—elastic element: 2210—main magnet; 2211—auxiliary magnet; 222—spring plate: 223—support; 224—support block; 225—washer; 226—magnetic bowl: 30—liter; 40—first power amplifier: 41—second power amplifier; 51—first magnetic shield; 52—second magnetic shield; 60—groove.

DESCRIPTION OF EMBODIMENTS

The following describes the technical solutions in the embodiments of this application with reference to the accompanying drawings in the embodiments of this application. It is clearly that the described embodiments are merely a part rather than all of the embodiments of this application.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more such features.

In addition, in this application, orientation terms such as "upper" and "lower" are defined relative to an orientation in which a component is schematically placed in the accompanying drawings. It should be understood that these orientation terms are relative concepts and are used for relative description and clarification, and these orientation terms may change accordingly based on changes of the orientation in which the component is placed in the accompanying drawings.

Figure 1:
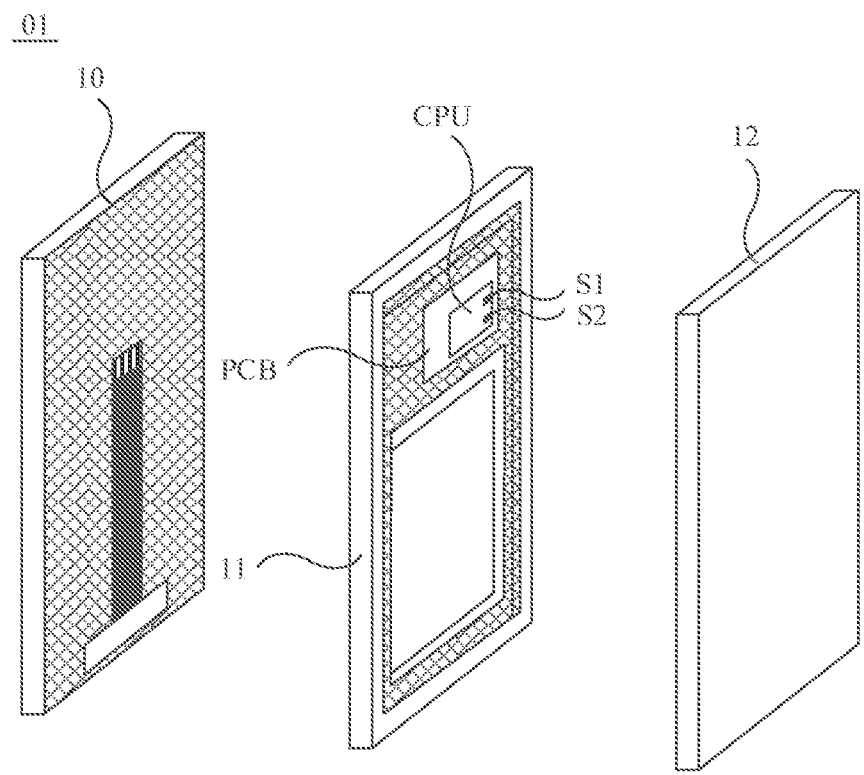
FIG. 1 is a schematic structural diagram of a mobile terminal according to an embodiment of this application.

An embodiment of this application provides a mobile terminal 01 shown in FIG. 1. The mobile terminal 01 includes, for example, a mobile phone, a tablet computer, a personal digital assistant (personal digital assistant, PDA), and a vehicle-mounted computer. A specific form of the mobile terminal 01 is not particularly limited in this embodiment of this application. For ease of description, an example in which the mobile terminal 01 is a mobile phone is used for description.

As shown in FIG. 1, the mobile terminal 01 mainly includes a display module 10, a middle frame 11, and a housing 12. The display module 10 and the middle frame 11 are disposed in the housing 12. The mobile terminal 01 further includes a central processing unit (Central Processing Unit, CPU) disposed on a PCB.

Figure 2:
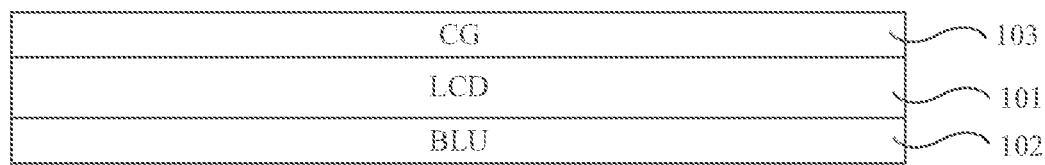
FIG. 2 is a schematic structural diagram of a display module shown in FIG. 1.

As shown in FIG. 2, the display module 10 includes a display panel (display panel, DP) 101.

In some embodiments of this application, the display panel 101 may be a liquid crystal display (liquid crystal display, LCD). In this case, the display module 10 further includes a back light unit (back light unit, BLU) 102 configured to provide a light source for the liquid crystal display.

Figure 3:
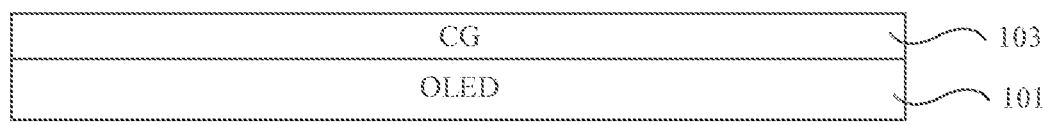
FIG. 3 is another schematic structural diagram of a display module shown in FIG. 1.

Alternatively, in some other embodiments of this application, as shown in FIG. 3, the display panel 101 is an organic light-emitting diode (organic light emitting diode, OLED) display, and the OLED display can implement self-luminescence. Therefore, no BU J needs to be disposed in the display module 10.

It should be rioted that, a substrate in the OLED display may be made of a flexible resin material. In this case, the OLED display is a flexible display.

Alternatively, the substrate in the OLED display may be made of a relatively hard material, for example, glass. In this case, the OLED display is a hard display.

In some embodiments of this application, as shown in FIG. 2 or FIG. 3, the display module 10 further includes a cover 103 located on a display side of the display panel 101, for example, a cover glass (cover glass. CG). The cover glass has specific toughness.

In addition, as shown in FIG. 1, the middle frame 11 is located between the display module 10 and the housing 12.

Figure 4A:
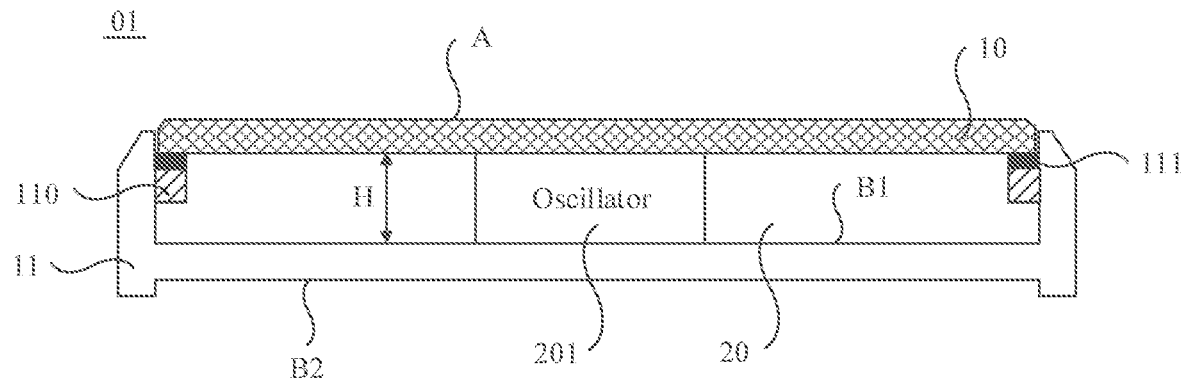
FIG. 4*a* is a schematic structural diagram of a mobile terminal with an oscillator according to an embodiment of this application.

As shown in FIG. 4a, a hearing table 110 in a ring shape is disposed on a side that is of the middle frame 11 and that is close to the display module 10. Foam adhesive 111 is pasted on the hearing table 110. The display module 10 is fastened to the middle frame 11 by using the foam adhesive 111, so that the display module 10 is connected to the middle frame 11.

A gap H exists between a back facet of the display module 10 fastened to the bearing table 110 and a first surface B1 of the middle frame 11, and the gap H forms an accommodation space 20.

It should be noted that the display module 10 has a light-emitting surface that can display an image. The back facet of the display module 10 refers to a surface of a side that is of the display module 10 and that is opposite to the light-emitting surface, that is a surface of a side that is of the display module 10 and that is close to the middle frame 11.

In addition, internal components such as a battery, a printed circuit hoard (printed circuit board, PCB), a camera (camera), and an antenna are mounted on a second surface B2 of the middle frame 11.

It should be noted that the first surface B1 and the second surface B2 of the middle frame 11 are disposed opposite to each other. The first surface B1 is close to the display module 10, and the second surface B2 is close to the housing 12.

The housing 12 is mounted on the middle frame 11, and the housing 12 can protect the foregoing internal components mounted on the second surface B2 of the middle frame 11.

In addition, the mobile terminal 01 further includes at least one oscillator 201 shown in FIG. 4a. The oscillator 201 is connected to the display module 10 and the middle frame 11.

In this case, the oscillator 201 is further electrically connected to a first signal end S1 (shown in FIG. 1) of the CPU. The oscillator 201 is configured to: receive a first drive signal provided by the first signal end S1; and drive, based on the first drive signal, the display module 10 to vibrate in a direction perpendicular to the light-emitting surface A of the display module 10.

In some embodiments of this application, the first drive signal may be an intermediate-frequency or high-frequency signal, for example, a signal whose frequency is higher than 250 Hz. For example, when the mobile terminal 01 is a mobile phone, the first drive signal may be an audio analog signal that is sent by the CPU of the mobile phone to the oscillator 201 and that is corresponding to an audio digital signal.

It can be learned from the foregoing description that the display module 10 is mounted on the bearing table 110 by using the foam adhesive 111. The foam adhesive 111 is elastic to some extent, and can be deformed under an action of an external force. In this way, when the oscillator 201 vibrates, based on the first drive signal, in the direction perpendicular to the light-emitting surface A of the display module 10, the oscillator 201 drives the display module 10 to move up and down, relative to the middle frame 11, at a small amplitude and a high frequency.

In this case, the small-amplitude and high-frequency vibration of the display module 10 cannot drive the middle frame 11 to vibrate. Therefore, the middle frame 11 is approximately in a static state.

In this case, driven by the oscillator 201, the display module 10 is used as a diaphragm to push air to generate sounds in the vibration process, so as to implement sound on display.

It can be learned from the foregoing description that the display panel 101 in the display module 10 may be the LCD or the OLED display. In addition, compared with the LCD, the OLED display can self-illuminate. Therefore, a BLU does not need to be disposed in the display module 10, and the display module 10 is thin. When the display module 10 is used as the diaphragm to implement the sound on display, deformation is more likely to occur, so that a sound effect of the diaphragm is better.

In this case, a partial structure of the oscillator 201, the display module 10, and the foam adhesive 111 used to fasten the display module 10 to the middle frame 11 form a sound system used to implement the sound on display. In this case, the partial structure in the oscillator 201, the display module 10, and rut elastic coefficient of the foam adhesive 111 may affect a resonance frequency of die sound system.

Based on this, to make the sound system have a good vibration effect, a frequency of the first drive signal is the same as or approximately the same as the resonance frequency of the sound system.

Figure 4B:
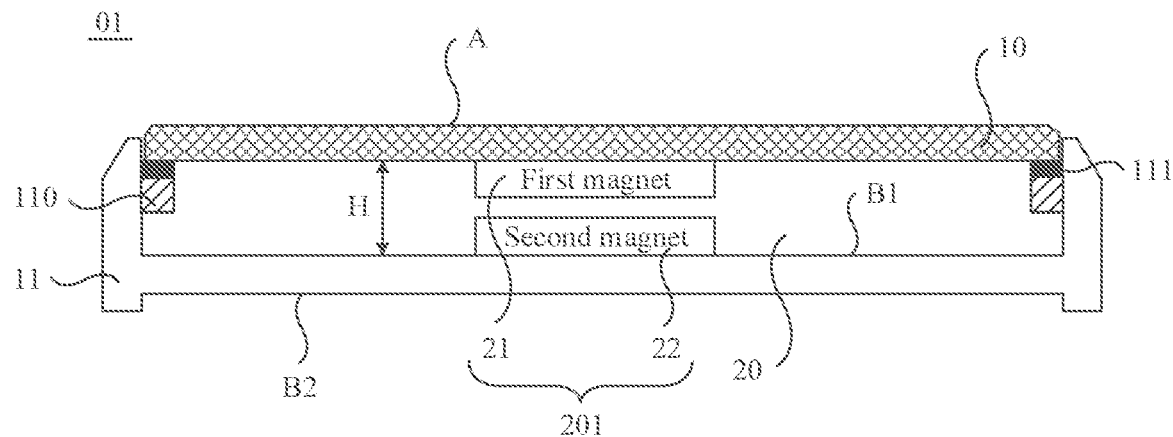
FIG. 4*b* is a schematic structural diagram of an oscillator in the mobile terminal shown in FIG. 4*a*.

In some embodiments of this application, as shown in FIG. 4b, the oscillator 201 includes a first magnet 21 and a second magnet 22. The first magnet 21 is disposed on the back facet of the display module 10, the second magnet 22 is disposed on the middle frame 11, and the first magnet 21 and the second magnet 22 are disposed face to face. In addition, at least a part of the first magnet 21 and at least a part of the second magnet 22 are located in the accommodation space 20.

The following describes in detail, by using examples, structures and disposing manners of the first magnet 21 and the second magnet 22 in the oscillator 201.

Example 1

Figure 5A:
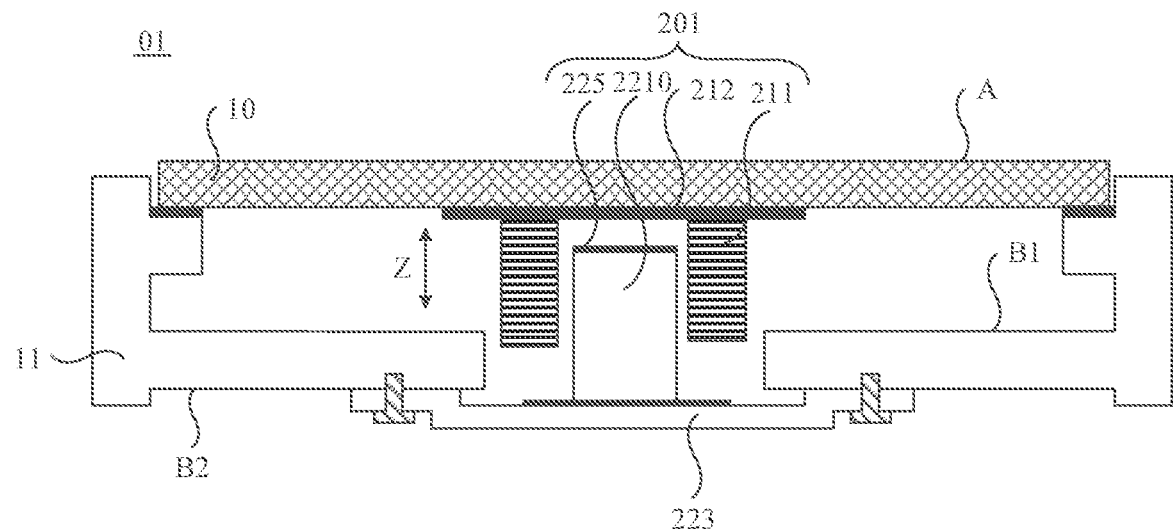
FIG. 5*a* is a schematic structural diagram of a first magnet and a second magnet in the mobile terminal shown in FIG. 4*b*.

In this example, as shown in FIG. 5a, the first magnet 21 is a coil 211, and the second magnet 22 is a main magnet 2210.

In this case, the coil 211 is disposed on the back facet of the display module 10, and the main magnet 2210 is disposed on the middle frame 11.

Figure 5B:
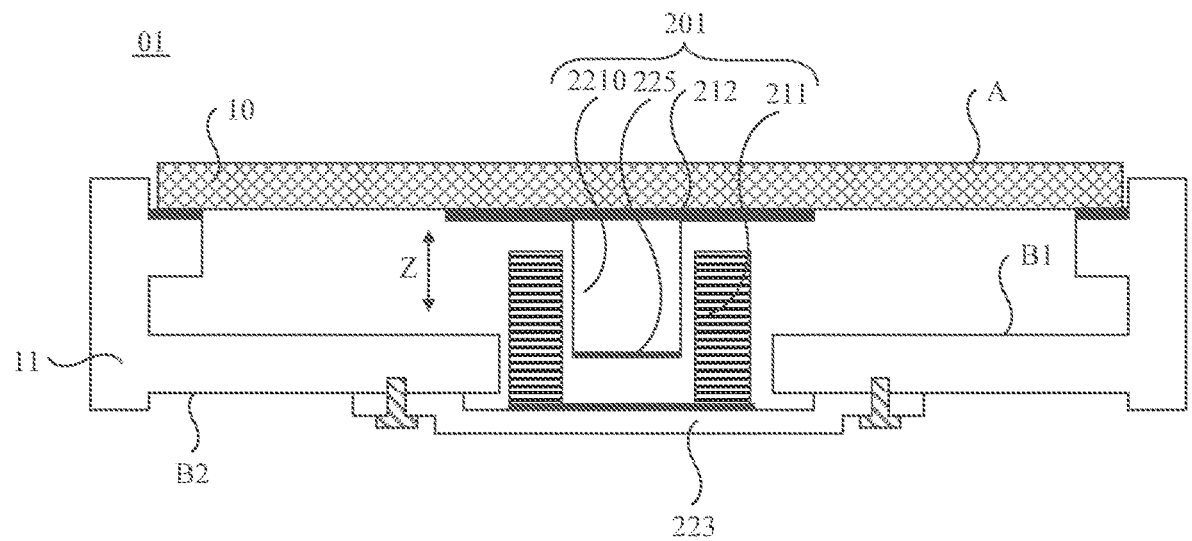
FIG. 5*b* is another schematic structural diagram of a first magnet and a second magnet in the mobile terminal shown in FIG. 4*b*.

Alternatively, as shown in FIG. 5b, the first magnet 21 is a main magnet 2210, and the second magnet is a coil 211.

In this case, the main magnet 2210 is disposed on the back facet of the display module 10, and the coil 211 is disposed on the middle frame 11.

In addition, in this example, a pan of the main magnet 2210 is embedded in a closed region wound by a w ire of the coil 211.

To enable the second magnet 22 (for example, the main magnet 2210 shown in FIG. 5a or the coil 211 shown in FIG. 5b) to be disposed on the middle frame 11, in some embodiments of the present disclosure, as shown in FIG. 5a or FIG. 5b, a hole is disposed in the middle frame 11.

The mobile terminal 01 includes a support 223. At least a part of the main magnet 2210 or the coil 211 is located in the hole on the middle frame 11.

The support 223 may be fastened to the second surface B2 (a surface of a side away from the display module 10) of the middle frame 11 through pasting by using an adhesive layer or through a threaded connection (a screw connection is used as an example in FIG. 5a).

In this case, the second magnet 22 (for example, the main magnet 2210 shown in FIG. 5a or the coil 211 shown in FIG. 5b) passes through the hole on the middle frame 11, and is disposed on the support 223. The second magnet 22 may be fastened, by using an adhesive layer, to a surface that is of the support 223 and that is close to the display module 10.

Figure 6:
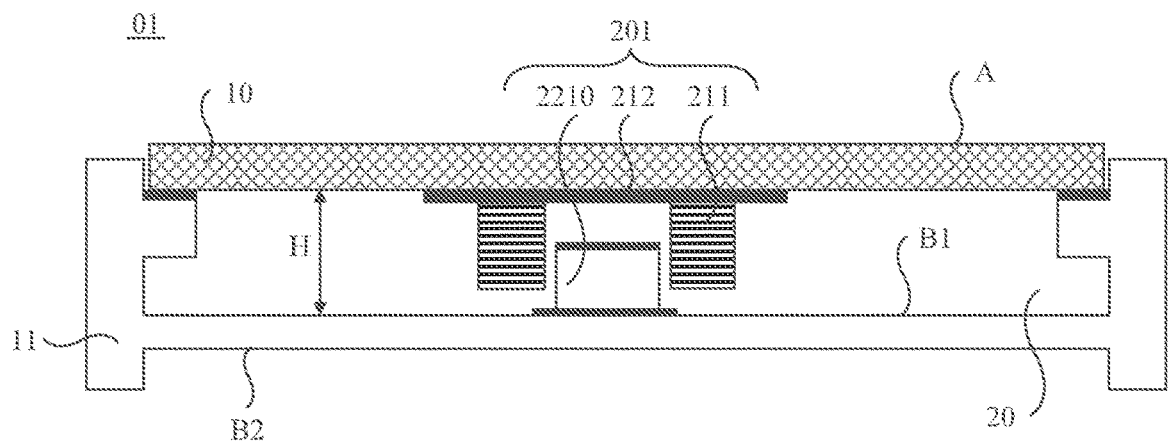
FIG. 6 is another schematic structural diagram of a mobile terminal with an oscillator according to an embodiment of this application.

Alternatively, in some other embodiments of the present disclosure, as shown in FIG. 6, when the spacing H between the display module 10 and the middle frame 11 is large enough, the entire oscillator 201 may be disposed between the display module 10 and the middle frame 11.

In this case, both the main magnet 2210 and the coil 211 are located in the accommodation space 20 between the display module 10 and the middle frame 11.

In this case, the second magnet 22 (for example, the main magnet 2210 shown in FIG. 6) may be directly fastened, by using an adhesive layer, to a surface of a side that is of the middle frame 11 and that is close to the display module 10.

In addition, in some embodiments of this application, positions of the main magnet 2210 and the coil 211 in FIG. 6 may alternatively be exchanged. To be specific, the first magnet 21 is the main magnet 2210, and the second magnet 22 is the coil 211. Similarly, the coil 211 used as the second magnet 22 may be directly fastened, by using the adhesive layer, to the surface of the side that is of the middle frame 11 and that is close to the display module 10.

Based on this, the mobile terminal 01 shown in FIG. 5a is used as an example to describe a process in which the mobile terminal 01 implements sound on display.

Figure 7:
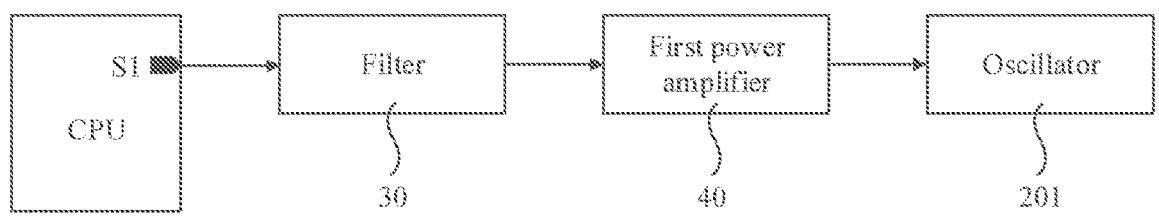
FIG. 7 is a schematic diagram of signal transmission in which the mobile terminal shown in FIG. 4b implements sound on display.

The coil 211 is electrically connected to the first signal end S1 of the CPU. In this case, to implement a sound on display mode, as shown in FIG. 7, a first drive signal provided by die first signal end S1 of the CPU is transmitted to the coil 211 in the oscillator 201 after being processed by a filter 30 and a first power amplifier 40.

The filter 30 can filter out a low-frequency signal from the first drive signal, so that a frequency of the first drive signal is closer to a frequency of the sound system.

In addition, the first power amplifier 40 can amplify a signal output by the filter 30, so that the coil 211 in the oscillator 201 identifies an amplified first drive signal.

In this case, when the coil 211 receives the first drive signal (that is, an intermediate-frequency or high-frequency-signal), the coil 211 generates an alternating magnetic field under an action of the first drive signal.

A magnitude and a direction of the magnetic field generated by the coil 211 vary with a change of the first drive signal. For example, when the coil 211 receives the first drive signal, if a current in the coil 211 is relatively large, strength of the magnetic field generated by the coil 211 is relatively large; or if a current in the coil 211 is relatively small, strength of the magnetic field generated by the coil 211 is relatively small.

In addition, a transmission direction of the current in the coil 211 may control the direction of the magnetic field generated by the coil 211.

The main magnet 2210 may be a permanent magnet, or an electromagnet receiving a constant current. In this case, the main magnet 2210 generates a constant magnetic field with a constant, size and direction.

It can be learned from the foregoing description that the first drive signal is die intermediate-frequency or high-frequency signal, and the frequency of the first drive signal is close to the resonance frequency of the sound system. Therefore, under interaction of the foregoing two magnetic fields, the coil 211 in the sound system may be enabled to vibrate up and down in a magnetic line cutting manner at a small amplitude and a high frequency along the foregoing Z direction.

In the sound system, the coil 211 in the oscillator 201 is connected to the display module 10. Therefore, in a process of vibrating up and down along a Z direction, the coil 211 can drive the display module 10 to vibrate up and down at a small amplitude and a high frequency in a same direction.

In this way, the coil 211, the display module 10, and the foam adhesive 111 used to fasten the display module 10 form the sound system, and the display module 10 is used as a diaphragm to push air to generate sounds in the vibration process, so as to implement sound on display. In this case, the sound system can implement a function of a receiver or a speaker, to play an audio signal.

It should be noted that the frequency of the first drive signal is proportional to a vibration frequency of the display module 10. In addition, a magnitude of the first drive signal, that is a magnitude of a current flowing into the coil 211, is proportional to a vibration intensity of the display module 10. A direction of the first drive signal, that is, a direction of a current flowing into the coil 211, is proportional to a vibration direction of the display module 10. Therefore, when the first drive signal is changed, a vibration form (including a vibration frequency, an amplitude, a direction, and the like) of the display module 10 driven by the coil 211 correspondingly changes, so that sounds generated by the sound system are different.

Based on this, to improve a vibration effect of the display module 10, as shown in FIG. 5a or FIG. 5b, the oscillator 201 further includes a support plate 212. An upper surface of the support plate 212 is fixedly mounted on a surface of a side that is of the display module 10 and that is close to the middle frame 11, and a lower surface of the support plate 212 is fixedly connected to the first magnet 21 (for example, the coil 211 shown in FIG. 5a or the main magnet 2210 shown in FIG. 5b). In this case, the first magnet 21 is connected to the display module 10 through the support plate 212.

In this way, because the support plate 212 is of a sheet structure, a contact area between the support plate 212 and the display module 10 is relatively large. Therefore, the upper surface and the lower surface of die support plate 212 are respectively in contact with the display module 10 and the first magnet 21, so that a contact area between the first magnet 21 and the display module 10 can be increased, and a driving force provided for the display module 10 can lie applied to the display module 10 more evenly in a vibration process of the first magnet 21.

In addition, by using the support plate 212, a deformed area of the display module 10 may be further expanded, so that vibration efficiency of the display module 10 driven by the first magnet 21 is increased, power consumption is reduced, and a sound on display effect is improved.

It should be noted that a material that forms the support plate 212 may be a metal material or another material with a relatively hard texture.

It can be learned from the foregoing description that the first magnet 21 (for example, the coil 211 shown in PIG. 5a or the main magnet 2210 shown in FIG. 5b), the display module 10, and the foam adhesive 111 form the sound system. The resonance frequency of the sound system may be determined by elastic coefficients of the first magnet 21, the support plate 212, the display module 10, and the foam adhesive 111.

In addition, there is a relatively large difference between the frequency of the first drive signal and a resonance frequency of the middle frame 11. Therefore, interaction between the magnetic field generated by the coil 211 and the magnetic field of the main magnet 2210 cannot drive the middle frame 11 to move up and down along a Z direction, and die middle frame 11 is in a static state.

In conclusion, in the mobile terminal 01 in this application, when the coil 211 in the oscillator 201 receives the intermediate-frequency or high-frequency signal, an electric field generated by the coil 211 interacts with an electric Held generated by the main magnet 2210, so that the coil 211 shown in FIG. 5a can drive the display module 10 to vibrate at a relatively small amplitude and a high frequency. The display module 10 is used as the diaphragm to push the air to generate sounds. In this way, the coil 211, the display module 10, and the foam adhesive 111 used to fasten the display module 10 to the middle frame 11 form the sound system, to implement the function of the speaker or the receiver.

In this case, a sound hole does not need to be disposed in the mobile terminal 01, so that a problem that sound quality is affected because the sound hole is blocked can be resolved. In addition, a hole opening process in the mobile terminal 01 is reduced, so that a surface of a display side of the mobile terminal 01 is more flat and rounded.

It should be noted that the structure shown in FIG. 5a is used as an example for description in the foregoing. A process of implementing sound on display shown in FIG. 5b and FIG. 6 is the same as that described above. Details are not described herein again.

In addition, in FIG. 5b, the coil 211 is disposed on the middle frame 11 as the second magnet 22. For example, a lower surface of the coil 211 may be fastened, by using an adhesive layer, to an upper surface of the support 223 connected to the middle frame 11. In this way, it can be learned from die foregoing description that the coil 211 needs to be electrically connected to the first signal end S1 of the CPU mounted on the middle frame 11, to separately receive the first drive signal provided by the first signal end S1. Therefore, the coil 211 is also mounted on die middle frame 11, so that an electrical connection manner between the coil 211 and the CPU can be simplified, and reliability of an electrical connection between the coil 211 and the CPU can be improved.

In addition, the first magnet 21 is used as the main magnet 2210 and is disposed on the back facet of the display module 10. This can avoid a problem that a display effect of the display module 10 is reduced because the coil 211 is heated after the coil 211 is powered on in a solution in which the coil 211 is used as the first magnet 21 and is connected to the display module 10.

Example 2

Figure 8A:
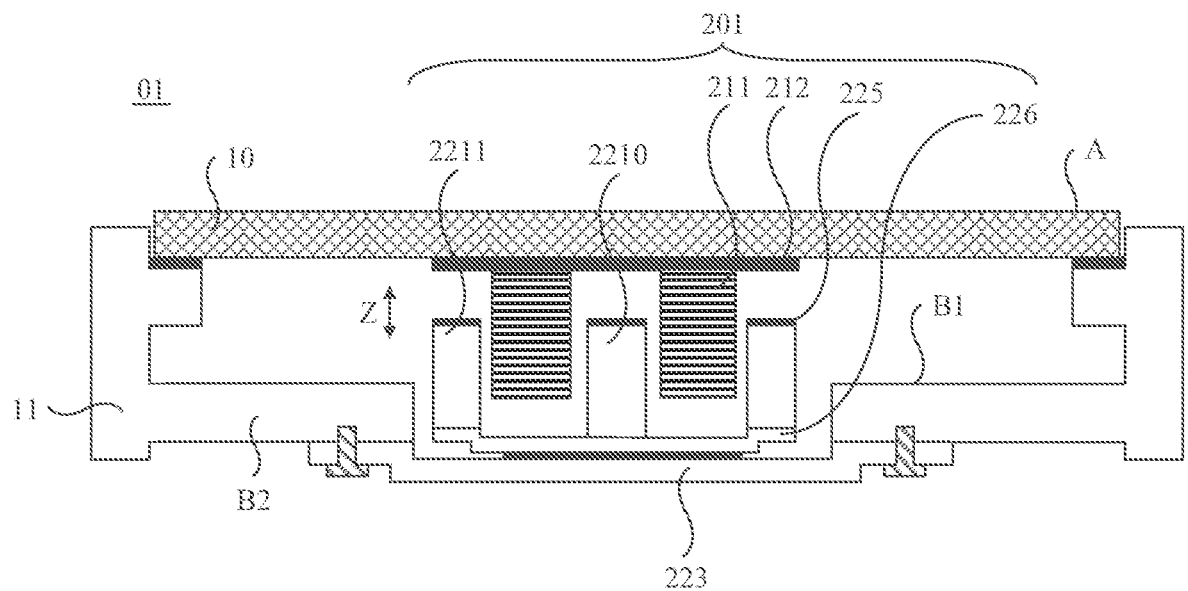
FIG. 8a is another schematic structural diagram of a first magnet and a second magnet in the mobile terminal shown in FIG. 4b.

In this example, as shown in FIG. 8a, the first magnet 21 is a coil 211, and the second magnet 22 is a main magnet 2210.

A part of the main magnet 2210 is embedded in a closed region wound by a wire of the coil 211.

In addition, a difference from Example 1 lies in that, as shown in FIG. 8a, the oscillator 201 further includes at least one auxiliary magnet 2211 located around the main magnet 2210.

The auxiliary magnet 2211 and the main magnet 2210 are located on a same side. In this case, as shown in FIG. 8a, when the main magnet 2210 is disposed on the middle frame 11 by using the support 223, the auxiliary magnet 2211 is also disposed on the middle frame 11. Alternatively, when the main magnet 2210 is disposed on a back facet of the display module 10, the auxiliary magnet 2211 is also disposed on the back facet of the display module 10.

In addition, there is a gap between the auxiliary magnet 2211 and the main magnet 2210. A part of the coil 211 is located in the gap between the auxiliary magnet 2211 and the main magnet 2210.

Figure 8B:
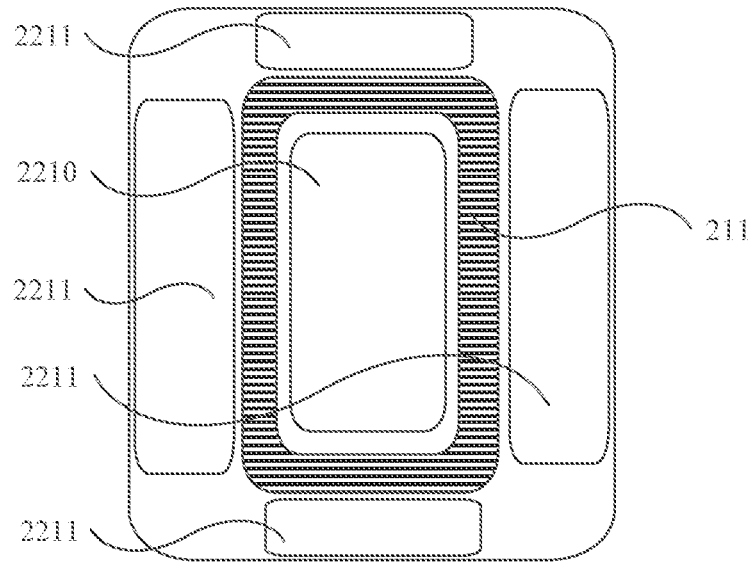
Figure 8C:
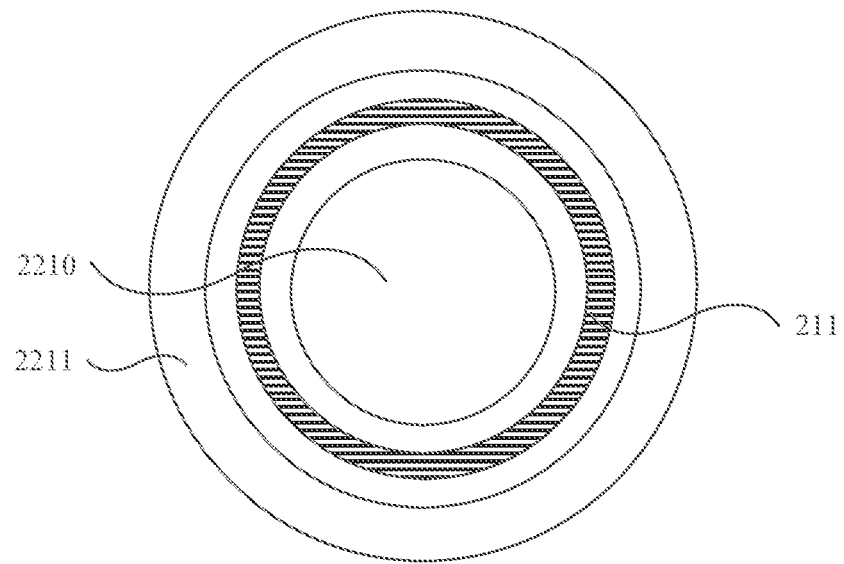

In this case, as shown in FIG. 8b or FIG. 8c, the main magnet 2210 is located in the closed region wound by the wire of the coil 211. As shown in FIG. 8b, four auxiliary magnets 2211 are disposed around the main magnet 2210, to form five magnetic circuits. Alternatively; in FIG. 8c, a circular main magnet 2210 is located in an annular auxiliary magnet 2211, to form dual magnetic circuits.

In this way, the magnetic field generated by the coil 211 not only can interact with the magnetic field generated by the main magnet 2210, but also can interact with a magnetic field generated by the at least one auxiliary magnet 2211, to achieve an objective of improving vibration intensity of the coil 211 or vibration intensity of the main magnet 2210.

In addition, to support the main magnet 2210, or the main magnet 2210 and the auxiliary magnet 2211, as shown in FIG. 8a. The oscillator 201 further includes a magnetic bowl 226. An upper surface of the magnetic bowl 226 is fixedly connected to lower surfaces of the main magnet 2210 and the auxiliary magnet 2211 by using an adhesive layer. A lower surface of the magnetic bowl 226 passes through a hole in the middle frame 11, and is fastened to the upper surface of the support 223 by using the adhesive layer.

The magnetic bowl 226 may be made of stainless steel. In this case, the magnetic bowl 226 may have a magnetic isolation function, to reduce a probability that magnetic fields generated by the main magnet 2210 and the auxiliary magnet 2211 have an adverse impact on another device in the mobile terminal 01.

Figure 9A:
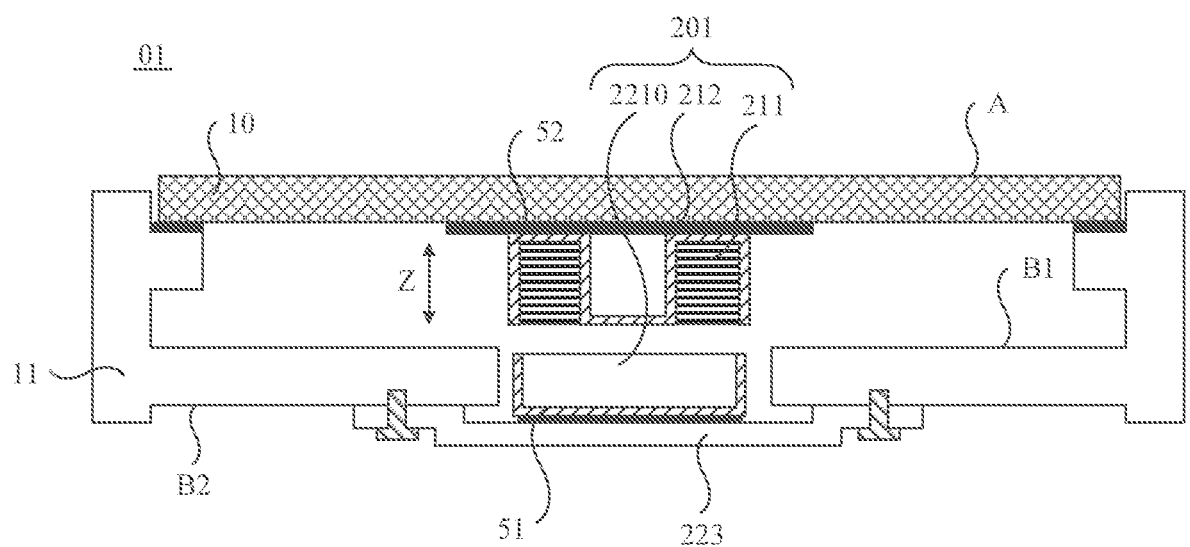
FIG. 9a is another schematic structural diagram of a first magnet and a second magnet in the mobile terminal shown in FIG. 4b.

In addition, to improve uniformity of the magnetic fields generated by the main magnet 2210 and the auxiliary magnet 2211, the oscillator 201 further includes a washer 225 (a black cover layer that is of the main magnet 2210 and the auxiliary magnet 2211 and that is close to an upper surface of the display module 10 in FIG. 9a) covered on a surface of a side that is of the main magnet 2210 and the auxiliary magnet 2211 and that is close to the display module 10. The washer 225 is made of low-carbon steel. The washer has a magnetic conduction function, to reduce magnetic resistance of the main magnet 2210 and the auxiliary magnet 2211. In addition, the washer 225 has the magnetic isolation function. It should be noted that the mobile terminal 01 shown in FIG. 8a can also implement the sound on display process described in Example 1. Details are not described herein again.

In addition, in some embodiments of this application, positions of the main magnet 2210. The auxiliary magnet 2211, and the coil 211 in FIG. 8a may alternatively be exchanged. To be specific, the first magnet 21 is the main magnet 2210, and the second magnet 22 is the coil 211. In this case, the main magnet 2210 and the auxiliary magnet 2211 are fastened to the back facet of the display module 10, and the coil 211 is fastened to the upper surface of the support 223 by-passing through the hole on the middle frame. In this case, the washer 225 covers a surface of a side that is of the main magnet 2210 and the auxiliary magnet 2211 and that is away from the display module 10. A process in which a mobile terminal having this structure implements sound on display is the same as that described above. Details are not described herein again.

Example 3

In this example, as shown in FIG. 9a, the first magnet 21 is a coil 211, and the second magnet 22 is a main magnet 2210.

In this case, the coil 211 may be disposed on a back facet of the display module 10, and the main magnet 2210 is disposed on the middle frame 11.

Figure 9B:
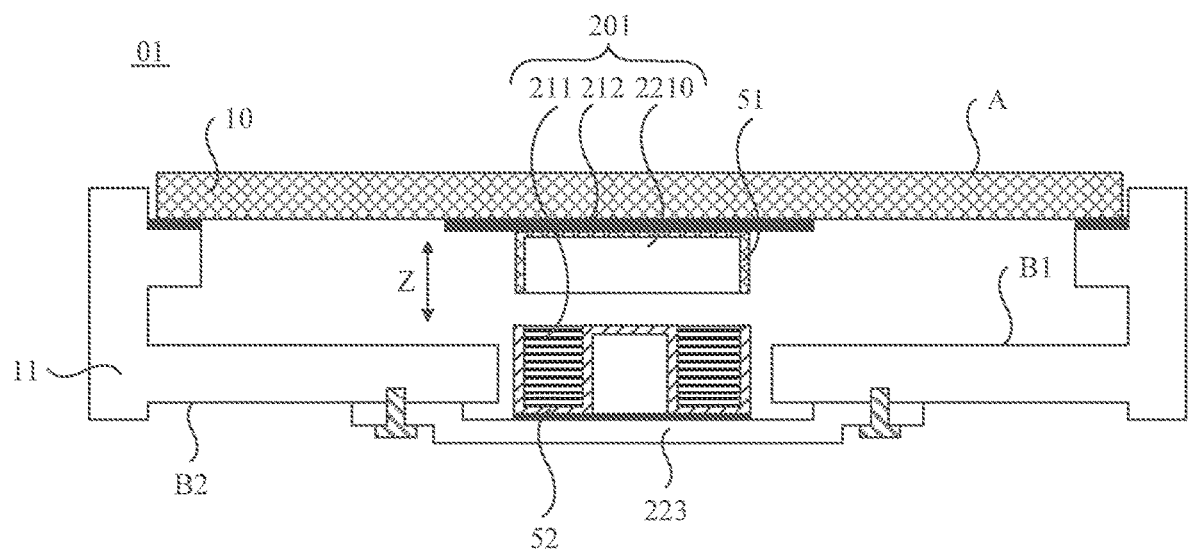

Alternatively, as shown in FIG. 9b, the first magnet 21 is a main magnet 2210, and the second magnet 22 is a coil 211.

In this case, the main magnet 2210 may be disposed on the back facet of the display module 10, and the coil 211 is disposed on the middle frame 11.

In this example, an annular structure shown in FIG. 8b or FIG. 8c may be used as a top view structure of the coil 211.

In addition, a difference from Example 1 lies in that the main magnet 2210 is located outside a closed region wound by a wire of the coil 211. The main magnet 2210 is parallel to a surface opposite to the coil 211.

In this way, in a process of assembling the oscillator 201, the main magnet 2210 does not need to be embedded in the closed region wound by the wire of the coil 211, resolving a problem that the main magnet 2210 and the closed region wound by the wire of the coil 211 cannot be aligned. Therefore, alignment precision of the main magnet 2210 and the coil 211 is reduced, rind difficulty in assembling the entire mobile terminal 01 is reduced.

Figure 10A:
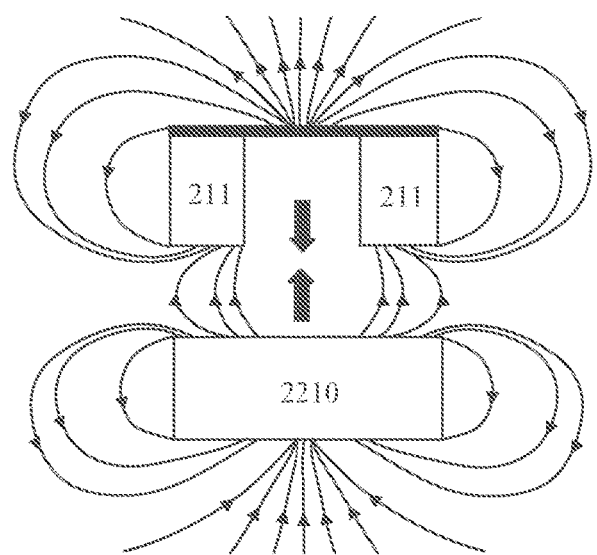

In this case, after the coil 211 is powered on, as shown in FIG. 10a, a magnetic field generated by the coil 211 and a magnetic field generated by the main magnet 2210 may generate an attraction force.

Figure 10B:
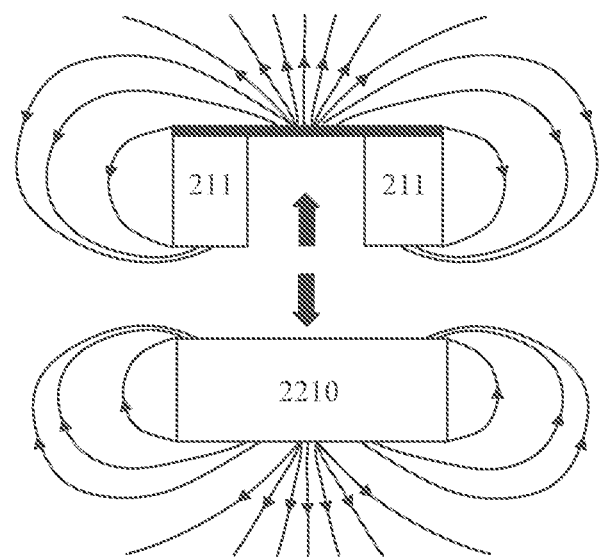

Alternatively, after a direction of a current flowing into the coil 211 changes, as shown in FIG. 10b, a magnetic field generated by the coil 211 and a magnetic field generated by the main magnet 2210 may generate a repulsive force.

In this ease, under an effect of the magnetic field generated by the coil 211 and the magnetic field generated by the main magnet 2210, vibration directions of the coil 211 and the main magnet 2210 are opposite.

It should be noted that when the electrified coil 211 and the main magnet 2210 vibrate close to each other, opposite surfaces of the two are not in contact with each other. When the electrified coil 211 and the main magnet 2210 vibrate away from each other, there is a specific distance between the opposite surfaces of the two. To avoid increasing the thickness of the mobile terminal 01. The distance may be less than or equal to 0.7 mm. In some embodiments of this application, the distance may further be less than or equal to 0.4 mm.

The mobile terminal 01 shown in FIG. 9a and FIG. 9b can also implement the sound on display process described above. A difference lies in that, in this example, when the coil 211 in the oscillator 201 receives the first drive signal, the magnetic field generated by the coil 211 and the magnetic field generated by the main magnet 2210 enable the coil 211 and the main magnet 2210 to attract or repel each other, so that the first magnet 21 (for example, the coil 211 shown in FIG. 9a, or the main magnet 2210 shown in FIG. 9b) vibrates, relative to the second magnet 22 (for example, the main magnet 2210 shown in FIG. 9a, or the coil 211 shown in FIG. 9b), at a small amplitude and a high frequency along a Z direction. In this way, the first magnet 21 drives the display module 10 to vibrate at a small amplitude and a high frequency, to implement the sound on display.

In addition, to reduce a probability that the magnetic fields generated by the coil 211 and the main magnet 2210 have an adverse impact on another device in the mobile terminal, the mobile terminal 01 provided in some embodiments of this application further includes a first magnetic shield 51 and a second magnetic shield 52 shown in FIG. 9a or FIG. 9b.

For the main magnet 2210, all surfaces except a surface of a side facing the coil 211 are wrapped by the first magnetic shield 51.

For the coil 211, all surfaces except at least a surface of a side facing the main magnet 2210 are wrapped by the second magnetic shield 52.

Example 4

Figure 11:
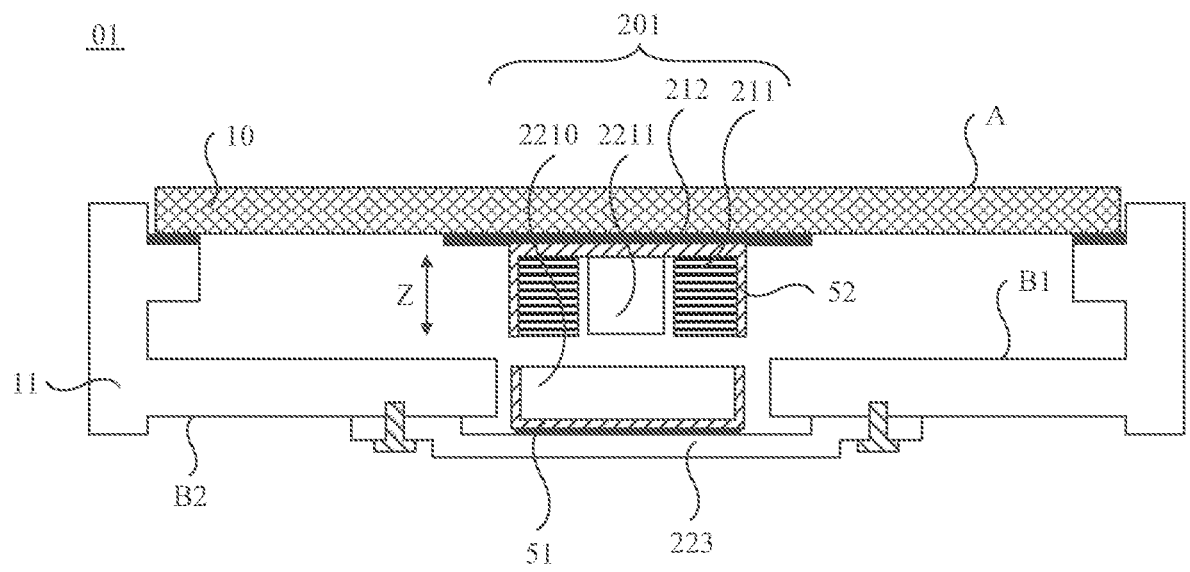

In this example, as shown in FIG. 11, the first magnet 21 is a coil 211, and the second magnet 22 is a main magnet 2210.

The main magnet 2210 is located outside a closed region wound by a wire of the coil 211. The main magnet 2210 is parallel to a surface opposite to the coil 211. A structure of the coil 211 is the same as that in Example 3.

A difference from Example 3 lies in that, as shown in FIG. 11. The oscillator 201 further includes an auxiliary magnet 2211. The auxiliary magnet 2211 and the coil 211 are located on a same side, and the auxiliary magnet 2211 is embedded in the closed region wound by the wire of the coil 211.

In this way, the magnetic field generated by the coil 211 not only can interact with the magnetic field generated by the main magnet 2210, but also can interact with a magnetic field generated by the auxiliary magnet 2211, to achieve an objective of improving vibration intensity of the coil 211 or vibration intensity of the main magnet 2210.

In addition, when the mobile terminal 01 includes the auxiliary magnet 2211, because the auxiliary magnet 2211 and die coil 211 are located on a same side, the auxiliary magnet 2211 is located in the second magnetic shield 52. A surface that is of the coil 211 and that is opposite to the auxiliary magnet 2211 is not covered by the second magnetic shield 52. In this case, the first magnetic shield 51 and the second magnetic shield 52 are U-shaped.

On this basis, the first magnetic shield 51 and the second magnetic shield 52 are made of a magnetic conductive material so as to reduce diffusion of a magnetic line in the magnetic fields generated by the main magnet 2210 and the coil 211, thereby achieving an objective of reducing magnetic resistance.

It should be noted that the mobile terminal 01 shown in FIG. 11 can also implement the sound on display process described above. Details are not described herein again.

In addition, in some embodiments of this application, positions of the main magnet 2210, the coil 211 and live auxiliary magnet 2211 in FIG. 11 may alternatively be exchanged. To be specific, the first magnet 21 is the main magnet 2210, and the second magnet 22 is the coil 211. In this case, the main magnet 2210 is fastened to the back facet of the display module 10, and the coil 211 and the auxiliary magnet 2211 are fastened to the upper surface of the support 223 by passing through the hole on the middle frame 11. A process in which a mobile terminal having this structure implements sound on display is the same as that described above. Details are not described herein again.

Figure 12A:
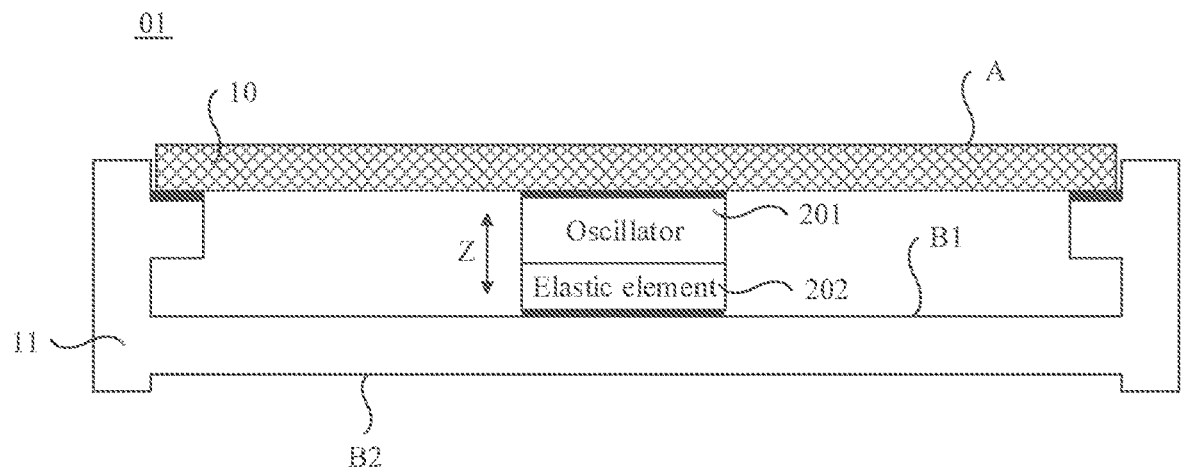
FIG. 12a is a schematic structural diagram of a mobile terminal with an oscillator and an elastic element according to an embodiment of this application.

The foregoing describes a structure of the mobile terminal 01 by using an example in which the mobile terminal 01 implements the sound on display. In some embodiments of this application, as shown in FIG. 12a, the mobile terminal 01 further includes an elastic element 202 connected to the oscillator 201. The elastic element 202 is fixedly mounted on the middle frame 11, and the elastic element 202 can deform under an action of an external force.

In this case, the coil 211 in the oscillator 201 is electrically connected to the first signal end S1 of the CPU. The first signal end S1 of the CPU may provide, in a time-division manner, the first drive signal and a second drive signal to the coil 211 in the oscillator 201.

Alternatively, in some other embodiments of this application, the coil 211 in the oscillator 201 is further electrically connected to a second signal end S2 (shown in FIG. 1) of the CPU, and the coil 211 in the oscillator 201 is configured to receive the second drive signal provided by the second signal end S2.

It should be noted that the second drive signal may be a low-frequency signal, for example, a signal whose frequency is less than about 250 Hz. For example, when the mobile terminal 01 is a mobile phone, the second drive signal may be a vibration signal that is sent by a central processing unit (central processing unit, CPU) of the mobile phone to the coil 211 and that is triggered by a signal of an incoming call or a receiving message.

In this case, when the coil 211 receives the second drive signal, the oscillator 201 vibrates at a large amplitude and a low frequency based on the second drive signal.

Because the elastic element 202 is connected to the oscillator 201, when the oscillator 201 vibrates at a large amplitude and a low frequency in a Z direction, the elastic element 202 can deform due to force, and then vibrate with the oscillator 201 along the Z direction.

Figure 12B:
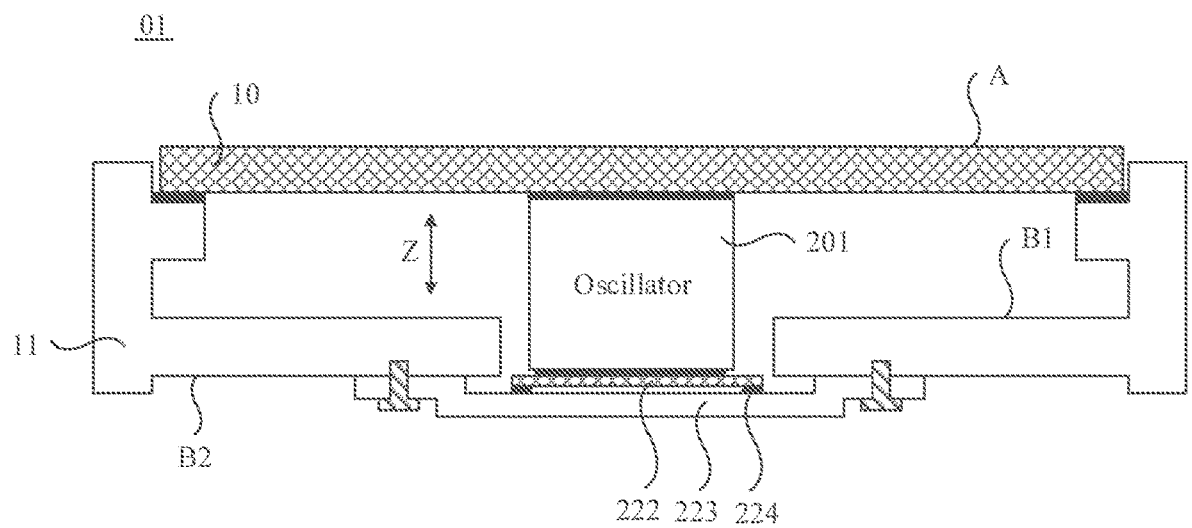

Because the elastic element 202 is fixedly mounted on the middle frame 11, in a vibration process, the elastic element 202 can drive the middle frame 11 and the mobile terminal 01 that includes the display module 10 connected to the middle frame 11, the housing 12, and the like, to implement relatively large and low-frequency vibration of the entire mobile terminal. In this case, vibration alert of the mobile phone may be implemented when there is an incoming call or an incoming message. In some embodiments of this application, as shown in FIG. 12b, the elastic element 202 may be a spring plate 222. The spring plate 222 is prone to deform under an action of an external force, and vibrates up and down along a Z direction. In this case, when the oscillator 201 vibrates at a large amplitude and a low frequency, an acting force can be applied to the spring plate 222. The spring plate 222 deforms under the acting force, and vibrates with the oscillator 201.

To implement vibration of the entire mobile terminal, the following describes a structure of the mobile terminal 01 having the spring plate 222.

Example 5

In this example, in order to make the spring plate 222 have some bounce space, as shown in FIG. 12b, a hole is disposed in the middle frame 11, and in a case in which the mobile terminal 01 includes the support 223, die mobile terminal 01 further includes a support block 224. The spring plate 222 and the support block 224 are located in the hole on the middle frame 11.

In this case, in an example in which the second magnet 22 is the main magnet 2210 shown in FIG. 13, FIG. 14, FIG. 15, or FIG. 16, the spring plate 222 is located between the second magnet 22 and the support 223. The following describes a disposing position of the spring plate 222.

Figure 13:
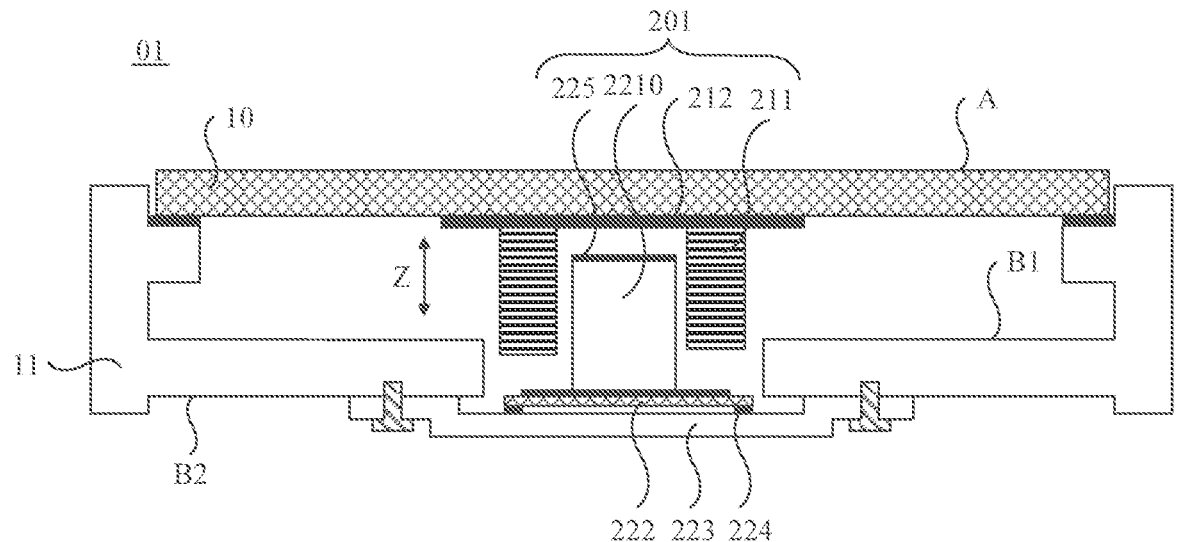
FIG. 13 is a schematic diagram of a disposing manner of an oscillator and a spring plate in a mobile terminal shown in FIG. 12b.

For example, in some embodiments of this application, as shown in FIG. 13, the spring plate 222 is directly connected to a low er surface of the main magnet 2210 by using an adhesive layer (a black cover layer on an upper surface of the spring plate 222).

Figure 14:
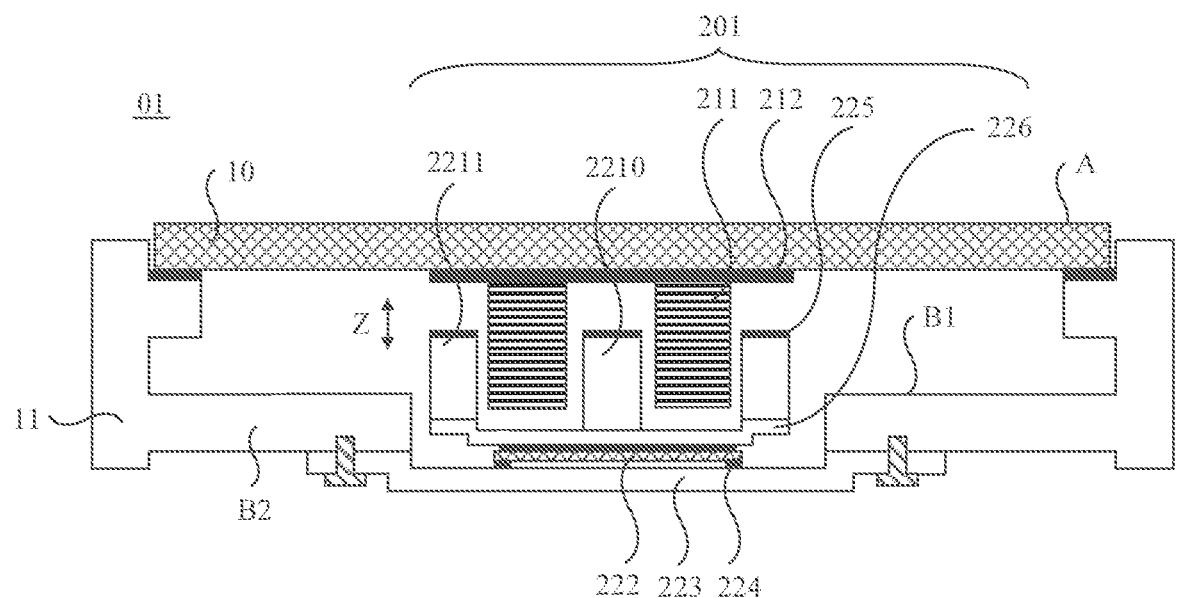
FIG. 14 is another schematic diagram of a disposing manner of an oscillator and a spring plate in a mobile terminal shown in FIG. 12b.

For another example, in some other embodiments of this application, as shown in FIG. 14, in a case in which the main magnet 2210 is located in a closed region wound by a wire of the coil 211, when the mobile terminal 01 further includes an auxiliary magnet 2211 located on a same side as the main magnet 2210, the main magnet 2210 and the auxiliary magnet 2211 may be disposed on the magnetic bowl 226. In this case, the spring plate 222 is connected to a lower surface of the magnetic bowl 226 by using an adhesive layer.

Figure 15:
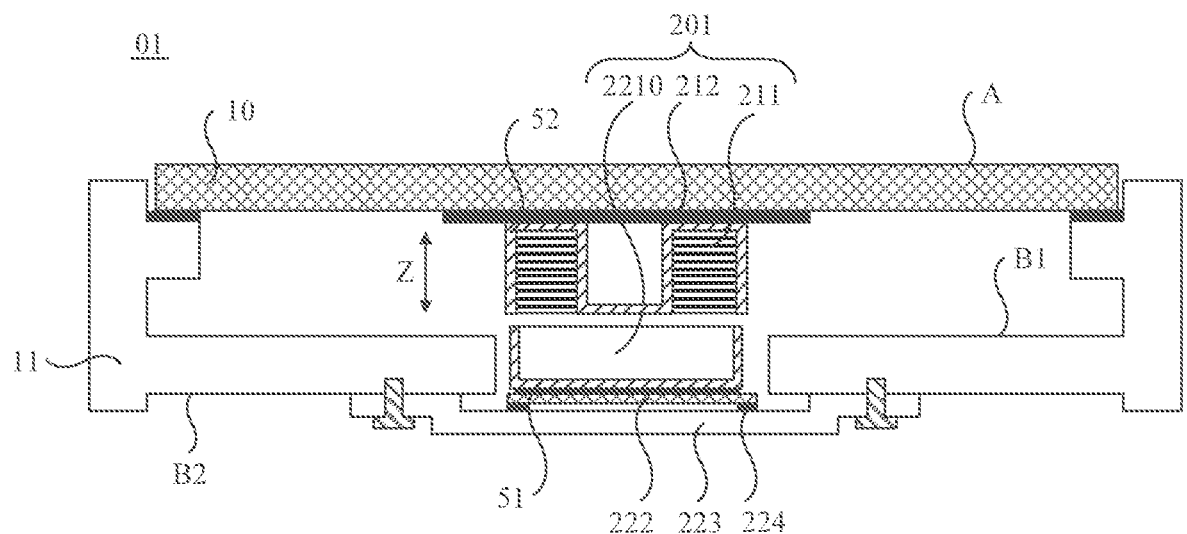
FIG. 15 is another schematic diagram of a disposing manner of an oscillator and a spring plate in a mobile terminal shown in FIG. 12b.

For another example, in some other embodiments of this application, as shown in FIG. 15, in a case in which the main magnet 2210 and the coil 211 are disposed lace to face, and the main magnet 2210 is located outside the closed region wound by the wire of the coil 211, when the main magnet 2210 is located in the first magnetic shield 51, the spring plate 222 is connected to a lower surface of the first magnetic shield 51 by using an adhesive layer.

Figure 16:
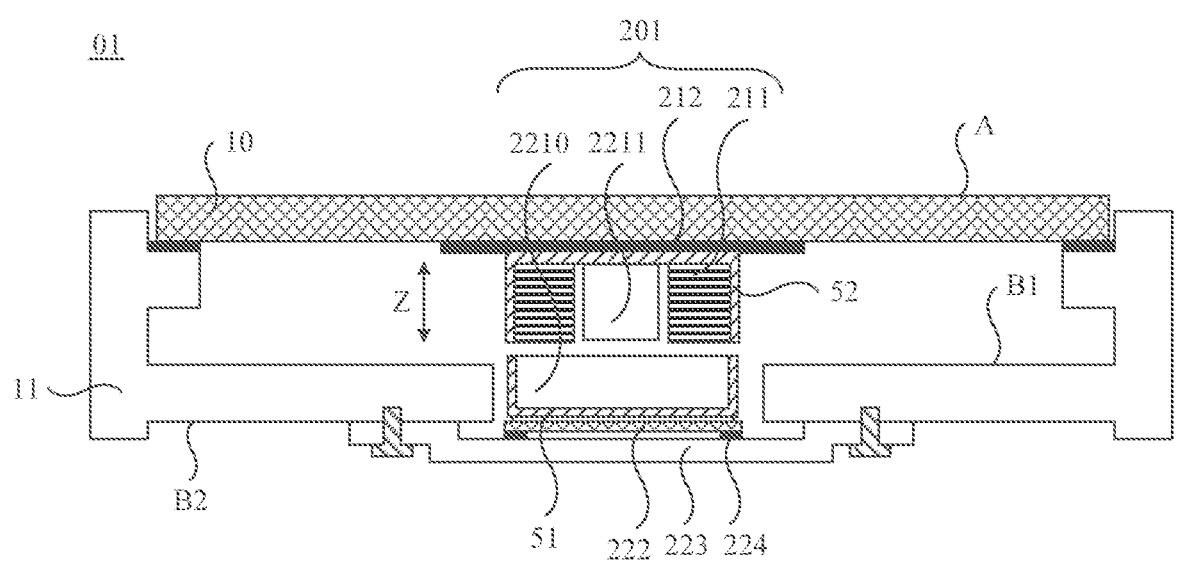
FIG. 16 is another schematic diagram of a disposing manner of an oscillator and a spring plate in a mobile terminal shown in FIG. 12b.

In addition, based on the structure shown in FIG. 15, when the mobile terminal further includes the auxiliary magnet 2211 shown in FIG. 16, because the auxiliary magnet 2211 is located on a same side as the coil 211, and is embedded in the closed region wound by the w ire of the coil 211, the spring plate 222 is still connected, by using an adhesive layer, to the lower surface of the first magnetic shield 51 in which the main magnet 2210 is accommodated.

Figure 17:
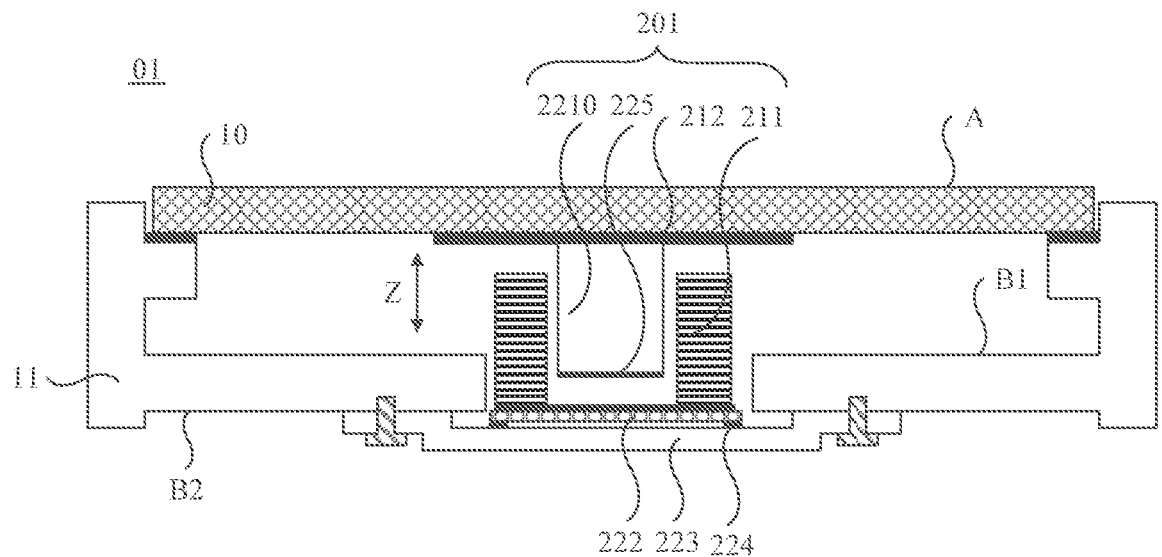
FIG. 17 is another schematic diagram of a disposing manner of an oscillator and a spring plate in a mobile terminal shown in FIG. 12b.
Figure 18:
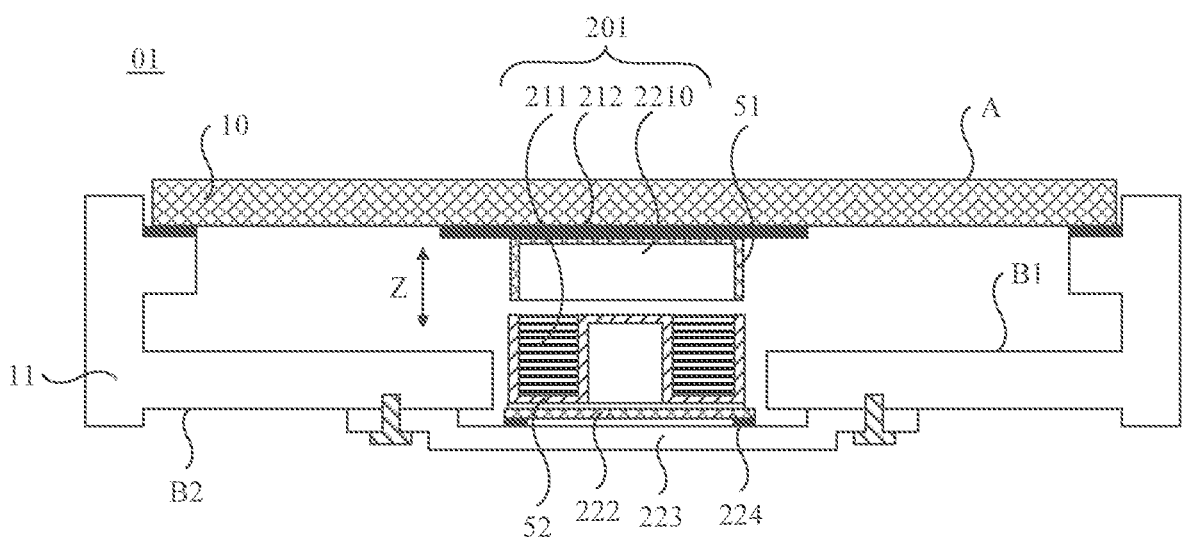
FIG. 18 is another schematic diagram of a disposing manner of an oscillator and a spring plate in a mobile terminal shown in FIG. 12b.

Alternatively, an example in which the second magnet 22 is the coil 211 shown in FIG. 17 or FIG. 18 is used to describe a disposing position of the spring plate 222.

For example, in some other embodiments of this application, as shown in FIG. 17, the spring plate 222 is directly connected to a lower surface of the coil 211 by using an adhesive layer.

For another example, in some other embodiments of this application, as shown in FIG. 18, when the main magnet 2210 and the coil 211 are disposed face to face, and the main magnet 2210 is located outside the closed region wound by the wire of the coil 211. The spring plate 222 is connected, by using an adhesive layer, to a lower surface of the second magnetic shield 52 in which the coil 211 is accommodated.

In addition, the support block 224 is disposed between the spring plate 222 and the support 223, and an upper surface and a lower surface of the support block 224 are respectively connected to the spring plate 222 and the support 223.

In this case, with the support of the support block 224, a specific gap may exist between the spring plate 222 and the support 223 when no external force is applied to the spring plate 222, and the gap may be used as a bounce space in which the spring plate 222 deforms under an external force, in addition, when the main magnet 2210 (or the coil 211) drives the spring plate 222 to vibrate in the bounce space, vibration of the spring plate 222 may be transferred to the middle frame 11 through the support 223.

Figure 19:
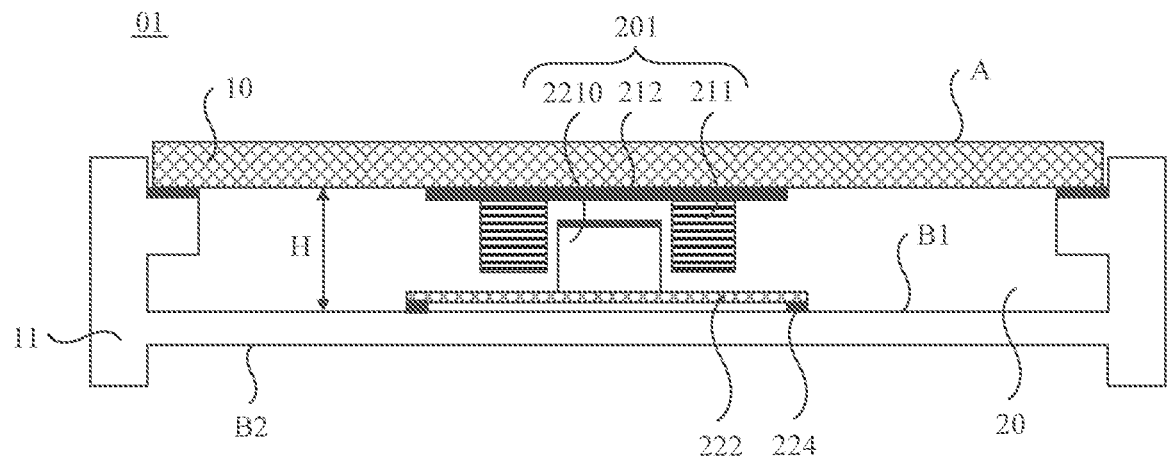

In addition, in this example, when a structure of the mobile terminal 01 is shown in FIG. 19, and the spring plate 222, the support block 224. The first magnet 21 (for example, the coil 211 in FIG. 19). The second magnet 22 (for example, the main magnet 2210 in FIG. 19), and the auxiliary magnet 2211 in the mobile terminal 01 are all located in the accommodation space 20, to make the spring plate 222 have some bounce space, the spring plate 222 may be located between the second magnet 22 and the middle frame 11, and the spring plate 222 may be connected to the second magnet 22 by using an adhesive layer.

In addition, the support block 224 is disposed between the spring plate 222 and the middle frame 11, and an upper surface and a lower surface of the support block 224 are respectively connected to the spring plate 222 and the middle frame 11.

In this case, with the support of the support block 224, a specific gap may exist between the spring plate 222 and the middle frame 11 when no external force is applied to the spring plate 222, and the gap may be used as a bounce space in which the spring plate 222 deforms under an external force. In addition, when the second magnet 22 (for example, the main magnet 2210 in FIG. 19) drives the spring plate 222 to vibrate in the bounce space, vibration of the spring plate 222 may be transferred to the middle frame 11.

It can be learned from the foregoing description that the spring plate 222 can drive the middle frame 11 to vibrate, and drive, by using the middle frame 11, the entire mobile terminal 01 to vibrate. Therefore, the spring plate 222 may be used as a vibration system that drives the entire mobile terminal 01 to vibrate. In this case, an elastic coefficient of the spring plate 222 can affect a resonance frequency of the vibration system.

The elastic coefficient k, a mass m, and a resonance frequency f of the spring plate 222 satisfy the following formula (1):

$$f = \frac{1}{2\pi} \times \sqrt{\frac{k}{m}} \quad (1)$$

In this case, when a material and a size of the selected spring plate 222 are different the resonance frequency of the spring plate 222 changes, and the resonance frequency of the vibration system also changes.

Based on this, to make the vibration system have a good vibration effect, a frequency of the second drive signal needs to be the same as or approximately the same as the resonance frequency of the vibration system.

Figure 20A:
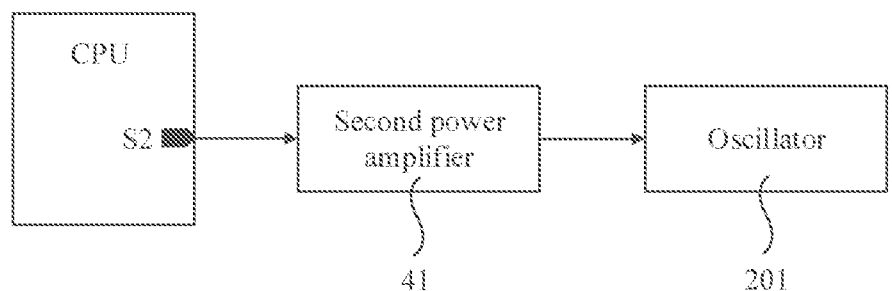
FIG. 20a is a schematic diagram of signal transmission in which the mobile terminal shown in FIG. 13 implements vibration of an entire mobile terminal.

In this case, a structure shown in FIG. 13 is used as an example to describe a process in which the mobile terminal 01 implements vibration of the entire mobile terminal. As shown in FIG. 20a, the second drive signal provided by the second signal end S2 of the CPU is transmitted to the coil 211 in the oscillator 201 after being processed by a second power amplifier 41. The second power amplifier 41 can amplify the second signal end S2, so that the coil 211 identifies an amplified second drive signal.

In this case, after the coil 211 receives the second drive signal (that is, a low-frequency signal), the coil 211 generates an alternating magnetic field under an action of the second drive signal.

As described above, the main magnet 2210 generates a constant magnetic field with a constant size and direction.

The second drive signal is a low-frequency signal, and has a relatively large difference from the resonance frequency of the sound system. Therefore, when the two magnetic fields interact with each other, the coil 211 in the sound system does not drive the display module 10 used as a diaphragm to vibrate at a high frequency, and consequently, the display module 10 cannot drive air to make sounds. The sound system is in a non-working state.

In addition, the frequency of the second drive signal is close to the resonance frequency of the spring plate 222 used as the vibration system. Therefore, interaction between the magnetic field generated by the coil 211 and the magnetic field of the main magnet 2210 can drive the spring plate 222 to move up and down along a Z direction.

In this case, the spring plate 222 drives the middle frame 11 to vibrate by using the support 223. In addition, the display module 10 connected to the middle frame 11, the housing 12, and the like vibrate together at a low frequency and a large amplitude. In this case, the vibration system is in a working state, and the entire mobile terminal 01 vibrates. The vibration system may play a role of a motor, and may implement vibration alert of the mobile phone when there is an incoming call or an incoming message.

In this case, the spring plate 222 may implement a function of the motor, and the motor does not need to be separately disposed in the mobile terminal 01. Compared with the motor, the spring plate 222 has a smaller volume, thereby saving more architecture space. A component with another function, such as a front-facing camera, a rear-facing camera, and a fingerprint sensor, may be disposed in the architecture space. In this way, integration of functions of the mobile terminal 01 is improved.

In addition, the structure shown in FIG. 13 is used as an example to describe a process in which the mobile terminal 01 implements sound on display and vibration of the entire mobile terminal.

Figure 20B:
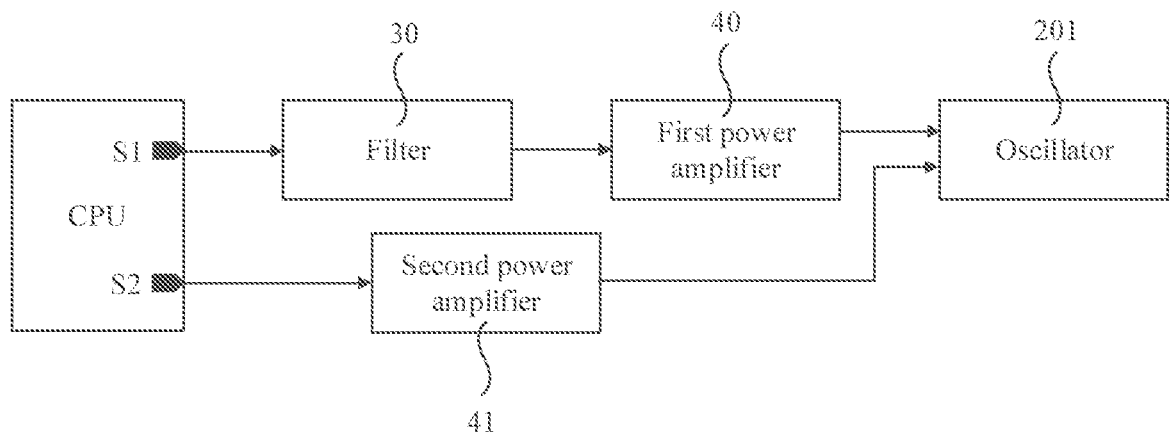
FIG. 20b is a schematic diagram of signal transmission in which the mobile terminal shown in FIG. 13 implements sound on display and vibration of an entire mobile terminal.

To implement a sound on display mode and a vibration of the entire mobile terminal 01 mode, as shown in FIG. 20b, the first drive signal provided by the first signal end S1 of the CPU is transmitted to the coil 211 in the oscillator 201 after being processed by the filter 30 and the first power amplifier 40. In addition, the second drive signal provided by the second signal end S2 of the CPU is transmitted to the coil 211 after being processed by the second power amplifier 41.

In this case, the coil 211 in the oscillator 201 may receive both the first drive signal (that is, an intermediate-frequency or high-frequency signal) and the second drive signal (that is, a low-frequency signal).

It should be noted that, when both the first drive signal and the second drive signal are input to the coil 211, a frequency of a superimposed signal received by the coil 211 is a sum of a frequency (for example, 1000 Hz) of the first drive signal and a frequency (for example, 100 Hz) of the second drive signal. In this case, a waveform of the superimposed signal is no longer a harmonic waveform.

In this case, the coil 211 generates an alternating magnetic field under an action of the superimposed signal. Under an action of the alternating magnetic field and the constant magnetic field generated by the main magnet 2210, the coil 211 is driven to drive the display module 10 to vibrate at a small amplitude and a high frequency in the Z direction. The display module 10 is used as a diaphragm to push air to generate sounds in the vibration process, to implement sound on display. In this case, the sound system is in a working state.

In addition, under the action of the alternating magnetic field generated by the superimposed signal and the constant magnetic Held generated by the main magnet 2210, the coil 211 drives the main magnet 2210 to drive the spring plate 222 to move up and down along the Z direction. In this case, the spring plate 222 drives the middle frame 11 to vibrate by using the support 223. In addition, the display module 10 connected to the middle frame 11, the housing 12, and the like vibrate together at a low frequency and a large amplitude. In this case, the vibration system is in a working state, and the entire mobile terminal 01 vibrates.

In conclusion, the resonance frequency of the sound system including the first magnet 21 (for example, the coil 211 shown in FIG. 13 or the main magnet 2210 shown in FIG. 17). The display module 10, and the foam adhesive 111 is far greater than the resonance frequency of the vibration system including the spring plate 222. Therefore, the spring plate 222 can work as a frequency divider. When the coil 211 receives an intermediate-frequency or high-frequency first drive signal, the first magnet 21 drives the display module 10 to vibrate, so that the sound system works, thereby implementing the sound on display. When the coil 211 receives a low-frequency second drive signal, the second magnet 22 drives the spring plate 222 and the middle frame 11 connected to the spring plate 222 to vibrate, so that the vibration system works, thereby implementing the vibration of the entire mobile terminal.

It should be noted that the foregoing describes, by using the mobile terminal 01 shown in FIG. 13 as an example, a process in which the mobile terminal 01 implements the sound on display and the vibration of the entire mobile terminal. FIG. 14, FIG. 15, FIG. 16, FIG. 17, FIG. 18, and FIG. 19 may also implement the sound on display and the vibration of the entire mobile terminal. Details are not described herein again.

A disposing manner of the oscillator 201 and the spring plate 222 in the mobile terminal 01 provided in the embodiments of this application may use a structure described in any one of the foregoing examples.

Based on this, to improve uniformity of vibration of the display module 10 when the mobile terminal 01 makes sounds by implementing the sound on display, and/or uniformity of vibration of the entire mobile terminal when the entire mobile terminal 01 vibrates, the mobile terminal 01 may include at least two oscillators 201.

Figure 21:
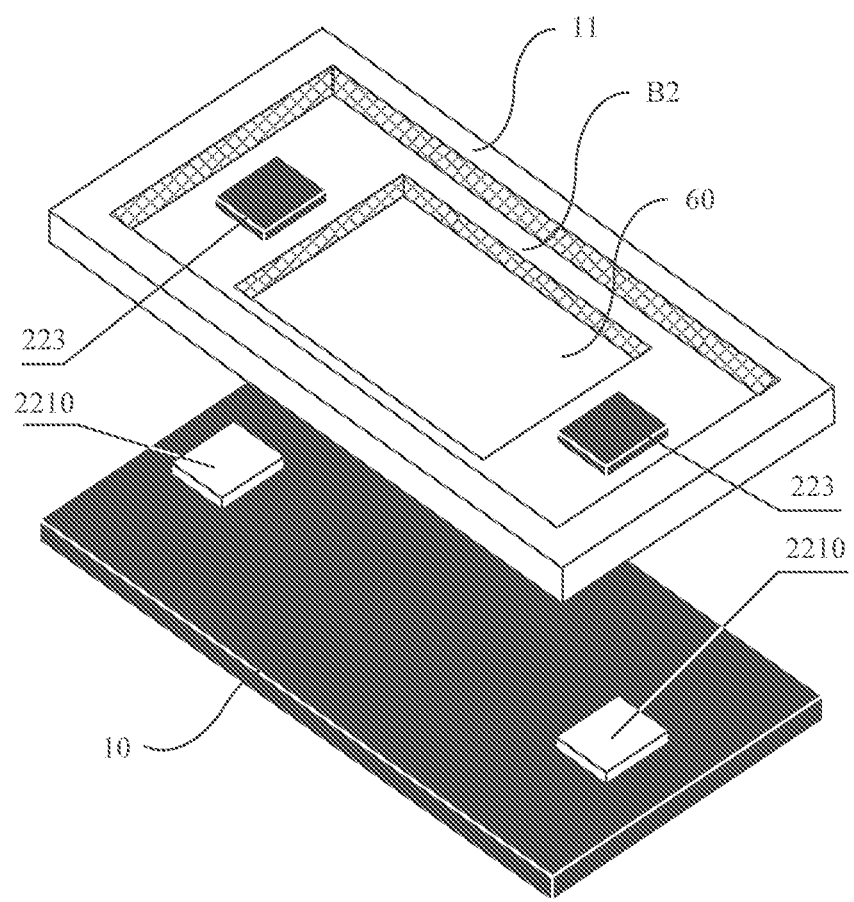
FIG. 21 is a schematic diagram of a disposing manner in which a mobile terminal includes a plurality of oscillators according to an embodiment of this application.

As shown in FIG. 21, a groove 60 for embedding a battery is disposed in a middle position of the middle frame 11. In this case, the two oscillators 201 are respectively located at an tipper end and a lower end of the groove 60, and are disposed away from a clearance area of an antenna. A hole (not shown in the figure) for embedding the oscillator 201 may be disposed in the middle frame 11, or the hole may not be disposed, and the two oscillators 201 are directly disposed on the middle frame 11.

An example in which the hole for embedding the oscillator 201 may be disposed on die middle frame 11 is used. When the mobile terminal 01 can implement sound on display, the first magnet 21 in the oscillator 201 may be disposed on a back facet of the display module 10, and is directly opposite to a position of the hole disposed on the middle frame 11. In addition, a part of the second magnet 22 in the oscillator 201 is located in the hole, and is fastened to the support 223, the support 223 is fastened to the second surface B2 of the middle frame 11 by using screws.

Alternatively, when the mobile terminal 01 can implement sound on display and entire mobile terminal vibration, as shown in FIG. 21. The first magnet 21 in the oscillator 201, for example, the main magnet 2210 shown in FIG. 5b, may be disposed on the display module 10, and is directly opposite to a position of the hole disposed on the middle frame 11. In addition, the second magnet 22 in the oscillator 201, for example, a part of the coil 211 shown in FIG. 5b, and the spring plate 222 are located in the hole, and are fastened to the support 223. The support 223 is fastened to the second surface B2 of the middle frame 11 by using screws.

It can be learned from the foregoing description that the main magnet 2210 is disposed on the display module 10, and the coil 211 is disposed on the middle frame 11. This can avoid a problem that a display effect of the display module 10 is reduced because the coil 211 is heated. In addition, an electrical connection manner between the coil 211 and the CPU can be further simplified, and reliability of an electrical connection between the coil 211 and the CPU can be improved.

Alternatively, the first magnet 21 in the oscillator 201, for example, the coil 211 shown in FIG. 5a, is disposed on the display module 10, and is directly opposite to a position of the hole disposed on the middle frame 11. In addition, the second magnet 22 in the oscillator 201, for example, a part of the main magnet 2210 shown in FIG. 5a, and the spring plate 222 are located in the hole, and are fastened to the support 223. The support 223 is fastened to the second surface B2 of the middle frame 11 by using screws.

The foregoing is described by using an example in which the mobile terminal 01 includes two oscillators 201. In a case in which the mobile terminal 01 has one oscillator 201. The oscillator 201 may lie disposed on an upper side of the mobile terminal 01. In other words, when a user answers a call, the oscillator 201 can be located near an ear of the user. In this way, when the mobile terminal 01 implements the sound on display by using the oscillator 201, in a process in which the user answers the mobile phone, an effect of the sound on display at a location of an ear is better, and a voice signal is clearer.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A mobile terminal comprising:
   a housing;
   a middle frame disposed in the housing;
   a display disposed in the housing and coupled to the middle frame to form an accommodation space, wherein the display comprises a back facet;
   a first magnet disposed on the back facet, wherein a first part of the first magnet is disposed in the accommodation space; and
   a second magnet disposed on the middle frame, wherein a second part of the second magnet is disposed in the accommodation space,
   wherein the first magnet and the second magnet are disposed in a face-to-face manner, and wherein the first magnet comprises a coil and the second magnet is a main magnet, or wherein the second magnet comprises a coil and the first magnet is a main magnet.

2. The mobile terminal of claim 1, wherein a third part of the main magnet is embedded in a closed region wound by a wire of the coil.

3. The mobile terminal of claim 2, further comprising an auxiliary magnet, wherein the auxiliary magnet and the main magnet are located on a same side with a gap between the auxiliary magnet and the main magnet, and wherein a fourth part of the coil is located in the gap.

4. The mobile terminal of claim 1, wherein the main magnet is located outside a closed region wound by a wire of the coil and is parallel to a surface opposite to the coil.

5. The mobile terminal of claim 4, further comprising an auxiliary magnet, wherein the auxiliary magnet and the coil are located on a same side, and wherein the auxiliary magnet is embedded in the closed region.

6. The mobile terminal of claim 1, further comprising:
a hole disposed in the middle frame, wherein a third part of the second magnet is located in the hole; and
a support coupled to the middle frame and disposed on a surface of a side of the middle frame that is away from the display, and wherein the second magnet passes through the hole and is disposed on the support.

7. The mobile terminal of claim 6, further comprising:
a spring plate located in the hole between the second magnet and the support and coupled to the second magnet; and
a support block located in the hole and disposed between the spring plate and the support, wherein the support block comprises:
an upper surface coupled to the spring plate; and
a lower surface coupled to the support.

8. The mobile terminal of claim 1, further comprising:
a spring plate located in the accommodation space and disposed between the second magnet and the middle frame, wherein the spring plate is coupled to the second magnet; and
a support block located in the accommodation space and disposed between the spring plate and the middle frame, wherein the support block comprises:
an upper surface coupled to the spring plate; and
a lower surface coupled to the middle frame, wherein the first magnet and the second magnet are located in the accommodation space.

9. The mobile terminal of claim 1, further comprising a support plate comprising:
an upper surface coupled to the display and comprising a first area; and
a lower surface coupled to the first magnet,
wherein the first area is greater than a second area of a surface of a side of the first magnet adjacent to the support plate.

10. The mobile terminal of claim 2, further comprising a washer located on a surface of a side of the main magnet that faces away from the display when the first magnet is the main magnet.

11. The mobile terminal of claim 2, further comprising a magnetic bowl for carrying the main magnet, wherein the magnetic bowl is located on a surface of a side of the main magnet that faces away from the display when the second magnet is the main magnet.

12. The mobile terminal of claim 4, comprising:
a first magnetic shield, wherein the main magnet is located in the first magnetic shield, and wherein, for the main magnet, all surfaces except a surface of a side facing the coil are wrapped by the first magnetic shield; and
a second magnetic shield, wherein the coil is located in the second magnetic shield, and wherein, for the coil, all surfaces except a surface of a side facing the main magnet are wrapped by the second magnetic shield.

13. The mobile terminal of claim 12, further comprising an auxiliary magnet located in the second magnetic shield, wherein a surface of the coil facing the auxiliary magnet is not covered by the second magnetic shield.

14. The mobile terminal of claim 2, further comprising a washer located on a surface of a side of the main magnet that faces away from the middle frame when the second magnet is the main magnet.

15. The mobile terminal of claim 1, wherein the display is further coupled to the middle frame using an elastic foam adhesive.

16. The mobile terminal of claim 15, wherein the first magnet is configured to receive a first drive signal.

17. The mobile terminal of claim 16, wherein the first magnet is further configured to generate a first magnetic field, and wherein the second magnet is configured to generate a second magnetic field.

18. The mobile terminal of claim 17, wherein the first magnet is further configured to:
vibrate in a direction perpendicular to a light-emitting surface of the display based on the first drive signal, the first magnetic field, and the second magnetic field; and
drive the display to move up and down relative to the middle frame to create a vibration process.

19. The mobile terminal of claim 18, wherein the display is configured to push, in response to being driven by the first magnet, air to generate sounds in the vibration process to implement sound on the light-emitting surface.

20. The mobile terminal of claim 11, wherein the magnetic bowl comprises a magnetic isolation material.

* * * * *